United States Patent
Guo et al.

(10) Patent No.: US 9,497,573 B2
(45) Date of Patent: Nov. 15, 2016

(54) SECURITY PROTOCOLS FOR UNIFIED NEAR FIELD COMMUNICATION INFRASTRUCTURES

(71) Applicant: QUALCOMM Incorporated, San Diego, CA (US)

(72) Inventors: Xu Guo, San Diego, CA (US); Aydin Aysu, Blacksburg, VA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/613,169

(22) Filed: Feb. 3, 2015

(65) Prior Publication Data
US 2016/0227348 A1 Aug. 4, 2016

(51) Int. Cl.
*H04B 5/00* (2006.01)
*H04W 4/00* (2009.01)
*H04L 9/32* (2006.01)

(52) U.S. Cl.
CPC ............ *H04W 4/008* (2013.01); *H04L 9/3278* (2013.01); *H04L 2209/80* (2013.01)

(58) Field of Classification Search
CPC . H04L 63/0853; H04L 63/08; H04L 63/083; H04L 41/0803; H04L 63/0884; H04L 63/102; H04L 9/0894; H04L 9/3213; H04L 9/3234; H04L 2209/56; H04L 2209/80; H04L 2463/082; H04L 29/06; H04L 41/08; G06F 21/35; G06F 21/31; G06F 19/3406; G06F 21/32; G06F 21/36; G06F 3/04883; G06F 3/04886; H04W 12/06; H04W 12/08; H04W 4/001; H04W 4/008; H04W 12/04; H04W 12/12; H04W 4/00; H04W 4/003; H04W 8/18
See application file for complete search history.

(56) References Cited

U.S. PATENT DOCUMENTS

| | | |
|---|---|---|
| 2008/0256600 A1 | 10/2008 | Schrijen et al. |
| 2011/0099117 A1 | 4/2011 | Schepers et al. |
| 2013/0142329 A1 | 6/2013 | Bell et al. |
| 2014/0181520 A1* | 6/2014 | Wendling ........... G06Q 20/3572 713/169 |
| 2014/0310515 A1* | 10/2014 | Kim ....................... H04L 9/321 713/155 |
| 2015/0304851 A1* | 10/2015 | Chen .................... H04W 12/08 713/172 |

FOREIGN PATENT DOCUMENTS

| | | |
|---|---|---|
| EP | 1770534 A1 | 4/2007 |
| EP | 2747335 A2 | 6/2014 |
| WO | WO-2006069194 A2 | 6/2006 |
| WO | WO-2009147548 A2 | 12/2009 |
| WO | WO-2014083436 A2 | 6/2014 |

OTHER PUBLICATIONS

Van Herrewege A., et al., "Reverse Fuzzy Extractors: Enabling Lightweight Mutual Authentication for PUF-enabled RFIDs," Financial Cryptography and Data Security, Lecture Notes in Computer Science, 2012, vol. 7397, pp. 374-389.
International Search Report and Written Opinion-PCT/US2016/012515-ISA/EPO-Apr. 22, 2016.
* cited by examiner

*Primary Examiner* — Golam Sorowar
(74) *Attorney, Agent, or Firm* — Loza & Loza, LLP

(57) ABSTRACT

One feature pertains to a near field communication (NFC) target device comprising a memory circuit adapted to store sensitive data, an NFC interface adapted to transmit and receive information using NFC protocols, and a processing circuit. The processing circuit receives a plurality of provider identification (PID) numbers from a plurality of providers, where each PID number is associated with a different provider. The processing circuit also stores the PID numbers at the memory circuit, and assigns a privilege mask to each PID number received and stored. The NFC target device may also include a physical unclonable function (PUF) circuit. The processing circuit may additionally provide one or more PID numbers as input challenges to the PUF circuit, and receive one or more PUF output responses from the PUF circuit, where the PUF output responses are different from one another and are associated with different providers.

20 Claims, 27 Drawing Sheets

1300 — *Verification Using Second Security Configuration at NFC Target Device*

1302: Receive a third message from the first provider, the third message including the first PID number, the first random number $r_1$, and the hash of the first PID number and the first random number $r_1$.

1304: Apply the first privilege mask assigned to the first PID number to limit the sensitive data available to the first provider to the first provider sensitive data.

1306: Provide the hash of the first PID number and the first random number $r_1$ to the PUF circuit as an input challenge to obtain a target-generated second noisy response $k_{v\_t}$.

1308: Execute the helper data generation function to generate helper data $h_v$ associated with the target-generated second noisy response $k_{v\_t}$.

1310: Compute a value $u_1$ that includes a hash of the UID number, the helper data $h_v$, the target-generated second noisy response $k_{v\_t}$, and the second random number $r_2$.

1312: Transmit a fourth message to the first provider, the fourth message including the UID number, the value $u_1$, the second random number $r_2$, the helper data $h_v$, and the first provider sensitive data.

*Verification Using Second Security Configuration at Server*

1802 — Transmit a third message to the NFC target device, the third message including the PID number, the first random number $r_1$, and the hash of the PID number and the first random number $r_1$.

1804 — Receive a fourth message from the NFC target device, the fourth message including the UID number, a value $u_1$, a second random number $r_2$ different than the first random number $r_1$, helper data $h_v$ associated with a target-generated second noisy response $k_{v\_t}$, and the provider sensitive data.

1806 — Obtain the PUF response k based on the UID number of the NFC target device.

1808 — Execute the reproduction function based on the PUF response k and the helper data $h_v$ to reproduce a provider-generated second noisy response $k_{v\_p}$.

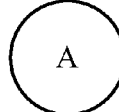

*FIG. 18A*

SECURITY PROTOCOLS FOR UNIFIED NEAR FIELD COMMUNICATION INFRASTRUCTURES

BACKGROUND

1. Field

Various features generally relate to security protocols and devices, and more particularly to security protocols and devices for unified near field communication (NFC) infrastructures.

2. Background

NFC is a set of short-range wireless technologies, typically requiring a distance of 10 cm or less. NFC operates at 13.56 MHz on ISO/IEC 18000-3 air interface and currently at rates ranging from 106 kbit/s to 424 kbit/s. NFC involves an initiator and a target. NFC targets may contain memory circuits that can store data that may be read and/or written to by NFC initiators. The initiator actively generates a radio frequency (RF) field that can power the NFC target, which is frequently a passive device having no power source of its own. Such passive NFC targets may thus take very simple form factors such as tags, stickers, or cards that do not require batteries.

One common use for NFC applications is to issue NFC target cards that contain information pertinent to a specific application, service, or purpose. A user may thus carry many different NFC cards each storing information associated with a different application, service, or purpose. Doing so may indeed prove cumbersome though, especially for those users carrying many cards.

Consequently, unified NFC card architectures have been proposed where a single NFC card stores information pertinent to many different applications, services, and purposes. For example, a unified NFC card may store a user's birthdate, social security number, phone number, age, address, account information associated with different services or merchants, credit card numbers, merchant/service rewards program card information, etc. The ability to store a variety of information on a single NFC card may be of great practical benefit to a user who ordinarily may have had to store such information on separate, individual NFC cards.

However, a security problem arises for unified NFC cards where the NFC initiator associated with a specific application, service, or purpose interrogates the NFC card to obtain information pertinent to it but rather, or in addition to such pertinent information, the initiator intentionally or unintentionally obtains data stored on the NFC card that is not associated to the initiator. For example, an NFC initiator associated with a supermarket may interrogate a user's NFC card with the intention of obtaining their supermarket rewards card number. In addition to this data, the NFC initiator may be able to read data unrelated to the supermarket account number including, for example, phone numbers, addresses, social security numbers, driver's license numbers, etc. and any other sensitive data that is stored on the NFC card.

Another security problem deals with NFC card "cloning." A nefarious third party may attempt to clone an original NFC card by copying all the data off it onto another imposter NFC card not associated with the original NFC card's user. The nefarious third party may then attempt to pass the cloned, imposter NFC card off as the original thereby potentially gaining access to things and services they shouldn't.

There is a need for security protocols and devices for unified NFC target architectures that provide security for the various types of data that may be stored on NFC targets. Specifically, there is a need for security protocols and devices that help prevent entities, such as services and merchants, from accessing sensitive data stored on NFC targets that is not associated with them or should otherwise be inaccessible. Additionally, there is a need for security protocols and devices that help thwart card cloning. Moreover, there is also a need for security protocols and devices that provide mutual authentication of both the NFC targets and the services providers/merchants, thereby allowing service providers and merchants to verify the identity of an NFC target before providing sensitive data to the NFC target.

SUMMARY

One feature provides a near field communication (NFC) target device comprising a memory circuit adapted to store sensitive data, an NFC interface adapted to transmit and receive information using NFC protocols, and a processing circuit communicatively coupled to the memory circuit and the NFC interface. The processing circuit is adapted to receive a plurality of provider identification (PID) numbers from a plurality of providers, where each PID number is associated with a different provider, store the PID numbers at the memory circuit, and assign a privilege mask of a plurality of privilege masks to each PID number received and stored, where each privilege mask of the plurality of privilege masks designates at least a portion of the sensitive data as associated to a provider of the plurality of providers. According to one aspect, the processing circuit is further adapted to transmit to each provider the portion of the sensitive data associated to the provider based on the privilege mask assigned to the PID number associated with the provider. According to another aspect, the processing circuit is further adapted to receive a privilege mask request from each provider indicating a desired level of sensitive data access before assigning the privilege mask to each PID number received and stored.

According to one aspect, the NFC target device further comprises a physical unclonable function (PUF) circuit communicatively coupled to the processing circuit, the PUF circuit adapted to generate output responses to input challenges, and wherein the processing circuit is further adapted to provide one or more PID numbers of the plurality of PID numbers as input challenges to the PUF circuit, and receive one or more PUF output responses from the PUF circuit in response to providing the one or more PID numbers as input challenges, the PUF output responses being different from one another and associated with different providers. According to one aspect, the processing circuit is further adapted to authenticate one or more providers using, at least in part, the one or more PUF output responses associated with the different providers. According to another aspect, the processing circuit is further adapted to enroll at least a first provider according to a security configuration causing the processing circuit to receive a first PID number from the first provider, the first PID number identifying the first provider, store the first PID number at the memory circuit, assign a first privilege mask to the first PID number, the first privilege mask designating at least a portion of the sensitive data as first provider sensitive data, and transmit a user identification (UID) number associated with the NFC target device to the first provider, the UID number identifying the NFC target device.

According to one aspect, the processing circuit is further adapted to verify the first provider according to the security configuration causing the processing circuit to receive the first PID number from the first provider, apply the first privilege mask assigned to the first PID number to limit the sensitive data available to the first provider to the first provider sensitive data, and transmit the UID number and the first provider sensitive data to the first provider. According to another aspect, the NFC target device further comprises a physical unclonable function (PUF) circuit communicatively coupled to the processing circuit, the PUF circuit adapted to generate output responses to input challenges, and wherein the processing circuit is further adapted to enroll at least a first provider according to a security configuration causing the processing circuit to receive a first message from the first provider, the first message including a first PID number and a hash of the first PID number and a first random number $r_1$, the first PID number identifying the first provider, store the first PID number at the memory circuit, assign a first privilege mask to the first PID number, the first privilege mask designating at least a portion of the sensitive data as first provider sensitive data, provide the hash of the first PID number and the first random number $r_1$ to the PUF circuit as an input challenge to obtain a first noisy response $k_e$, execute a helper data generation function to generate helper data $h_e$ associated with the first noisy response $k_e$, and transmit a second message to the first provider, the second message including a user identification (UID) number, the first noisy response $k_e$, and the helper data $h_e$, the UID number identifying the NFC target device.

According to one aspect, the processing circuit is further adapted to verify the first provider according to the security configuration causing the processing circuit to receive a third message from the first provider, the third message including the first PID number, the first random number $r_1$, and the hash of the first PID) number and the first random number $r_1$, apply the first privilege mask assigned to the first PID number to limit the sensitive data available to the first provider to the first provider sensitive data, provide the hash of the first PID number and the first random number $r_1$ to the PUF circuit as an input challenge to obtain a target-generated second noisy response $k_{v\_t}$, execute the helper data generation function to generate helper data $h_v$ associated with the target-generated second noisy response $k_{v\_t}$, compute a value $u_1$ that includes a hash of the UID number, the helper data $h_v$, the target-generated second noisy response $k_{v\_t}$, and a second random number $r_2$, and transmit a fourth message to the first provider, the fourth message including the UID number, the value $u_1$, the second random number $r_2$, the helper data $h_v$, and the first provider sensitive data. According to another aspect, the processing circuit is further adapted to verify the first provider according to a security configuration causing the processing circuit to transmit the UID number to the first provider, receive a third message from the first provider, the third message including the first PID number, the first random number $r_1$, and the hash of the first PID number and the first random number $r_1$, provide the hash of the first PID number and the first random number $r_1$ to the PUF circuit as an input challenge to obtain a target-generated second noisy response $k_{v\_t}$, execute the helper data generation function to generate helper data $h_v$ associated with the target-generated second noisy response $k_{v\_t}$, transmit a fourth message to the first provider, the fourth message including a second random number $r_2$ and the helper data $h_v$, the second random number $r_2$ different than the first random number $r_1$, receive a fifth message from the first provider, the fifth message including a third random number $r_3$ and a value $u_1$, the third random number different than the first random number $r_1$ and the second random number $r_2$, the value $u_1$ based on a hash of the UID number, a provider-generated second noisy response $k_{v\_p}$, the second random number $r_2$, and the third random number $r_3$, compute a value $u_2$ based on a hash of the UID number, the target-generated second noisy response $k_{v\_t}$, the second random number $r_2$, and the third random number $r_3$, authenticate the first provider based on the value $u_1$ received and the value $u_2$ computed, apply the first privilege mask assigned to the first PID number to limit the sensitive data available to the first provider to the first provider sensitive data, and transmit a sixth message to the first provider, the sixth message including the first provider sensitive data and a hash of the UID number, the target-generated second noisy response $k_{v\_t}$, and the third random number $r_3$. According to yet another aspect, the processing circuit is further adapted to encrypt the first provider sensitive data in the sixth message with the target-generated second noisy response $k_{v\_t}$ as a cryptographic key prior to transmitting the sixth message to the first provider.

Another feature provides a method operational at an NFC target device, the method comprising receiving a plurality of provider identification (PID) numbers from a plurality of providers, each PID number associated with a different provider, storing the PID numbers at a memory circuit, and assigning a privilege mask of a plurality of privilege masks to each PID number received and stored, each privilege mask of the plurality of privilege masks designating at least a portion of a sensitive data as associated to a provider of the plurality of providers. According to one aspect, the method further comprises receiving a privilege mask request from each provider indicating a desired level of sensitive data access before assigning the privilege mask to each PID number received and stored. According to another aspect, the method further comprises providing one or more PID numbers of the plurality of PID numbers as input challenges to a PUF circuit, and receiving one or more PUF output responses from the PUF circuit in response to providing the one or more PID numbers as input challenges, the PUF output responses being different from one another and associated with different providers. According to yet another aspect, the method further comprises authenticating one or more providers using, at least in part, the one or more PUF output responses associated with the different providers.

Another feature provides a server associated with a provider and part of a near field communication (NFC) infrastructure, the server comprising a communication interface adapted to directly and/or indirectly transmit to and receive information from an NFC target device, a memory circuit, and a processing circuit communicatively coupled to the communication interface and the memory circuit, the processing circuit adapted to transmit a provider identification (PID) number to the NFC target device, the PID number associated with the provider and being different than PID numbers of other providers, transmit a privilege mask request to the NFC target device, the privilege mask request indicating a desired privilege mask to be associated with the PID number, the desired privilege mask designating at least a portion of sensitive data stored at the NFC target device as provider sensitive data that is associated with the provider and accessible by the server, receive a user identification (UID) number associated with the NFC target device from the NFC target device, the UID number identifying the NFC target device, and store the UID number in the memory circuit. According to one aspect, transmitting the PID number to the NFC target device, transmitting the privilege mask request to the NFC target device, and receiving and storing the UID number enroll the provider with the NFC target device according to a security configuration, and wherein the processing circuit is further adapted to verify the NFC target device according to the security configuration causing the processing circuit to transmit the PID number to the NFC target device, receive a first message from the NFC target device, the first message including the UID number and the provider sensitive data, verify that the UID number received in the first message matches the UID number stored in the memory circuit, and accept the provider sensitive data received.

According to one aspect, the processing circuit is further adapted to enroll with the NFC target device according to a security configuration causing the processing circuit to transmit a first message to the NFC target device, the first message including the PID number and a hash of the PID number and a first random number $r_1$, receive a second message from the NFC target device, the second message including the UID number, a first noisy response $k_e$, and helper data $h_e$ associated with the first noisy response $k_e$, execute a reproduction function based on the first noisy response $k_e$ and the helper data $h_e$ to reproduce a physical unclonable function (PUF) response k, and store the response k in the memory circuit, and wherein the processing circuit is further adapted to verify the NFC target device according to the security configuration causing the processing circuit to transmit a third message to the NFC target device, the third message including the PID number, the first random number $r_1$, and the hash of the PID number and the first random number $r_1$, receive a fourth message from the NFC target device, the fourth message including the UID number, a value $u_1$, a second random number $r_2$ different than the first random number $r_1$, helper data $h_v$ associated with a target-generated second noisy response $k_{v\_p}$, and the provider sensitive data, obtain the PUF response k based on the UID number of the NFC target device, execute the reproduction function based on the PUF response k and the helper data $h_v$ to reproduce a provider-generated second noisy response $k_{v\_p}$, compute a value $u_2$ based on a hash of the UID number, the helper data $h_v$, the provider-generated second noisy response $k_{v\_p}$, and the second random number $r_2$, authenticate the NFC target device based on the value $u_1$ received and the value $u_2$ computed, and accept the provider sensitive data received. According to another aspect, the processing circuit is further adapted to enroll with the NFC target device according to a security configuration causing the processing circuit to transmit a first message to the NFC target device, the first message including the PID number and a hash of the PID number and a first random number $r_1$, receive a second message from the NFC target device, the second message including the UID number, a first noisy response $k_e$, and helper data $h_e$ associated with the first noisy response $k_e$, execute a reproduction function based on the first noisy response $k_e$ and the helper data $h_e$ to reproduce a physical unclonable function (PUF) response k, and store the response k in the memory circuit, and wherein the processing circuit is further adapted to verify the NFC target device according to the security configuration causing the processing circuit to receive the UID number from the NFC target device, verify the UID number received from the NFC target device matches the UID number stored in the memory circuit, transmit a third message to the NFC target device, the third message including the PID number, the first random number $r_1$, and the hash of the PID number and the first random number $r_1$, receive a fourth message from the NFC target device, the fourth message including a second random number $r_2$ different than the first random number $r_1$ and helper data $h_v$ associated with a target-generated second noisy response $k_{v\_p}$, obtain the PUF response k based on the UID number of the NFC target device, execute the reproduction function based on the PUF response k and the helper data $h_v$ to reproduce a provider-generated second noisy response $k_{v\_p}$, compute a value $u_1$ based on a hash of the UID number, the provider-generated second noisy response $k_{v\_p}$, the second random number $r_2$, and a third random number $r_3$ different than the first random number $r_1$ and the second random number $r_2$, transmit a fifth message to the NFC target device, the fifth message including the value $u_1$ and the third random number $r_3$, receive a sixth message from the NFC target device, the sixth message including the provider sensitive data and a value $u_2$ based on a hash of the UID number, the target-generated second noisy response $k_{v\_p}$, and the third random number $r_3$, compute a value $u_3$ based on a hash of the UID number, the provider-generated second noisy response $k_{v\_p}$, and the third random number $r_3$, authenticate the NFC target device based on the value $u_2$ received and the value $u_3$ computed, and accept the provider sensitive data received. According to another aspect, the provider sensitive data is encrypted by the target-generated second noisy response $k_{v\_p}$, and the processing circuit is further adapted to decrypt the provider sensitive data received using the provider-generated second noisy response $k_{v\_p}$.

BRIEF DESCRIPTION OF THE DRAWINGS

FIG. 13 illustrates a process flow diagram of a verification process taking place at the NFC target device based on the second security configuration.

FIGS. 18A and 18B illustrate a process flow diagram of a verification process taking place at the server based on the second security configuration.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits and structures may be shown in block diagrams in order to avoid obscuring the aspects in unnecessary detail. In other instances, well-known circuits, structures and techniques may not be shown in detail in order not to obscure the aspects of the disclosure. The word "exemplary" is used herein to mean "serving as an example, instance, or illustration." Any implementation or aspect described herein as "exemplary" is not necessarily to be construed as preferred or advantageous over other aspects of the disclosure.

Overview

Some systems, methods, and apparatuses described herein pertain to an NFC target device that includes a memory circuit adapted to store sensitive data, an NFC interface adapted to transmit and receive information using NFC protocols, and a processing circuit. The processing circuit receives a plurality of provider identification (PID) numbers from a plurality of providers, where each PID number is associated with a different provider. The processing circuit also stores the PID numbers at the memory circuit, and assigns a privilege mask to each PID number received and stored. The NFC target device may also include a physical unclonable function (PUF) circuit. The processing circuit may additionally provide one or more PID numbers as input challenges to the PUF circuit, and receive one or more PUF output responses from the PUF circuit, where the PUF output responses are different from one another and are associated with different providers.

Exemplary Apparatuses, Methods, and Systems for Unified NFC Infrastructures

Figure 1:
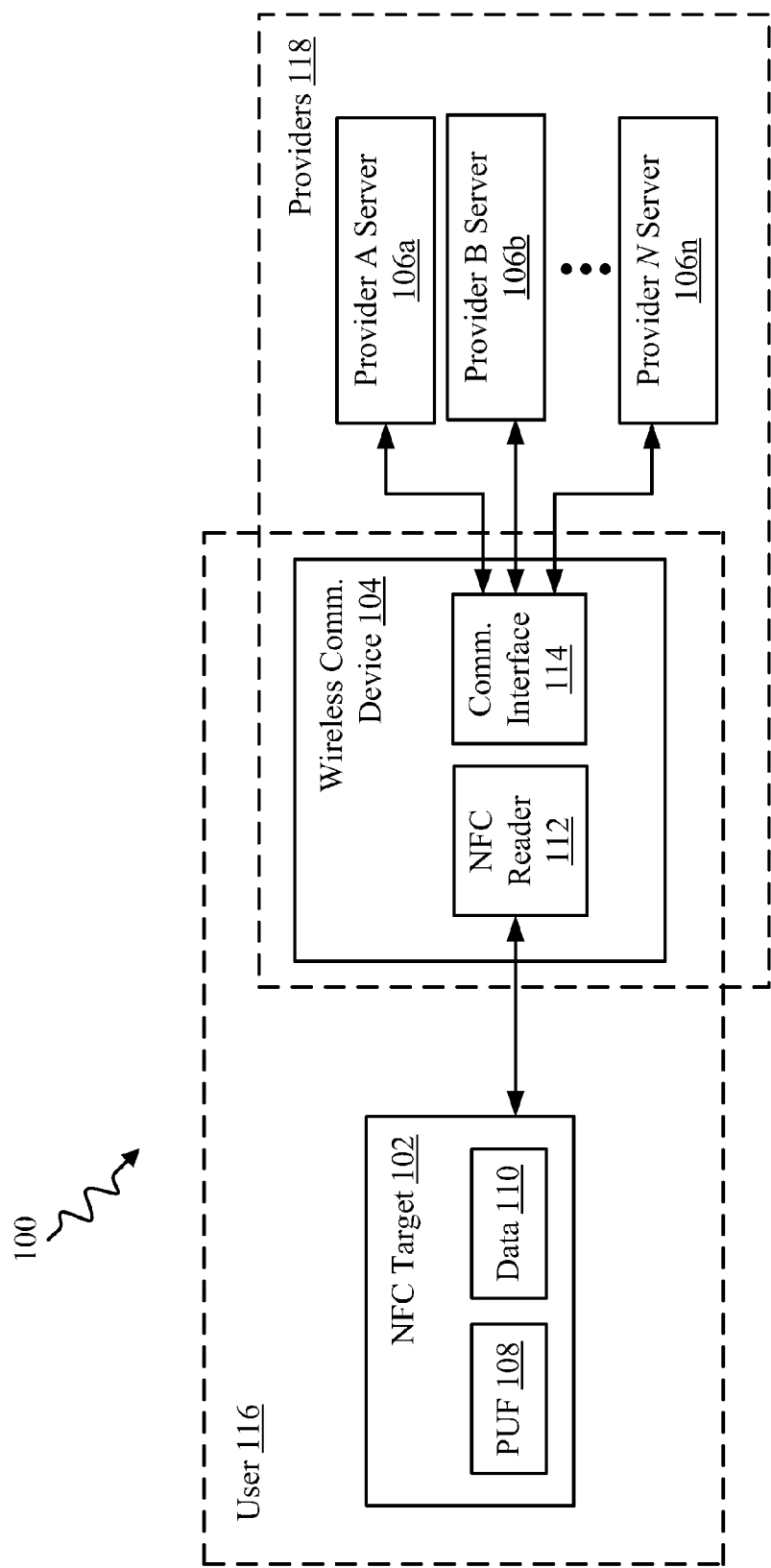
FIG. 1 illustrates a high-level schematic block diagram of a unified NFC infrastructure.

FIG. 1 illustrates a high-level schematic block diagram of a unified NFC infrastructure 100 (e.g., NFC system) according to one aspect of the disclosure. The infrastructure 100 may include an NFC target 102, a wireless communication device (WCD) 104, and a plurality of provider servers 106a, 106b . . . 106n.

Generally, the NFC target 102 may be a device with limited resources and computing power relative to the WCD 104. According to one example, the NFC target 102 may be a passive NFC target device such as, but not limited to, a tag, a card, a sticker, a key fob, etc. According to another example, the NFC target 102 may be an active device having its own power source. For purposes of clarity and simplicity the NFC target 102 may herein be referred to as an "NFC card." However, the NFC card 102 may be any other type of NFC target device not limited to a tag, a sticker, a key fob, etc.

The WCD 104 may be any wireless communication device that is capable of NFC so as to allow the WCD 104 to interrogate and communicate with the NFC card 102 using NFC protocols. Generally, the WCD 104 has more resources and computing power than the NFC card 102. The WCD 104 may also communicate with one or more servers 106a, 106b . . . 106n and other devices through wired communication protocols, long range wireless communication protocols, or other short range communication protocols. Some non-limiting examples of WCDs 104 may be, but are not limited to, laptops, smartphones, tablets, personal digital assistants, desktop terminals, wearable devices including smartwatches and head-mounted displays having NFC functionality.

The servers 106a, 106b . . . 106n may each be associated with a different provider 118 such as, but not limited to, a merchant or a provider of services. As some non-limiting, non-exclusive examples, a first server 106a may be associated with an establishment that serves alcoholic beverages to adults over a certain age, a second server 106b may be associated with a merchant, such as a supermarket, that provides membership cards to its customers to help facilitate a rewards program, and another server 106n may be a provider of services, such as a security company, that assigns security key cards and related account information to its customers.

The NFC card 102 includes a semiconductor device (e.g., chip) that includes a physically unclonable function (PUF) 108. A PUF is a chip-unique challenge-response mechanism exploiting manufacturing process variations inside one or more integrated circuits (ICs) of the device having the PUF. When a physical stimulus (e.g., challenge) is applied to the PUF, the PUF generates a response in an unpredictable but repeatable way due to the complex interaction of the stimulus with the physical microstructure of the device employing the PUF. This exact microstructure depends on physical factors introduced during manufacture of the device employing the PUF, which are unpredictable. The PUF is difficult to clone in that each device employing the PUF has a unique and unpredictable way of mapping challenges to responses, even if one device is manufactured with the same process as another seemingly identical device. Thus, it is very impractical to construct a PUF with the same challenge-response behavior as another device's PUF because exact control over the manufacturing process is extremely difficult if not infeasible.

The NFC device 102 further includes sensitive data 110. The sensitive data 110 may include data associated with the user 116 of the card 102 and/or data associated with one or more of the providers 118. For example, the sensitive data 110 may include the user's 116 birthdate, social security number, phone number, age, address, and credit card numbers. The sensitive data 110 may also include, for example, account numbers, customer numbers, and/or rewards program account data associated with the different providers 118. The sensitive data 110 may include many other types of data that the user 116 and/or the provider 118 wishes to keep secure.

The WCD 104 includes an NFC reader 112 and a communication interface 114. The NFC reader 112 allows the WCD 104 to communicate with the NFC card 102 using NFC communication protocols. The communication interface 114 may be, for example, a wireless communication interface that allows the WCD 104 to communicate to the one or more servers 106a, 106b . . . 106n through wireless wide area networks (WWAN), cellular networks, and/or short range communication protocols such as WiFi®, Zigbee®, etc.

According to one aspect, the WCD 104 may belong to and/or otherwise be associated with the user 116. For example, the WCD 104 may be a smartphone, laptop, tablet, personal digital assistant, desktop terminal, wearable device including a smartwatch and a head-mounted display that the user 116 carries along with them in addition to their NFC card 102. This enables the user 116 to use their WCD 104 at their convenience to read and/or write data 110 from/to their NFC card 102. For example, the WCD 104 may include a software application that the user 116 can use to program (e.g., write data) their NFC card 102 to include certain data 110.

According to another aspect, the WCD 104 may belong to and/or otherwise be associated with a provider 118. For example, the WCD 104 may be a smartphone, laptop, tablet, desktop terminal, kiosk, wearable device including a smartwatch and a head-mounted display, or a hand-held electronic device located at the provider 118. An employee or staff member of the provider 118 may use the WCD 104 to read and/or write data 110 from/to the user's 116 NFC card 102.

Figure 2:
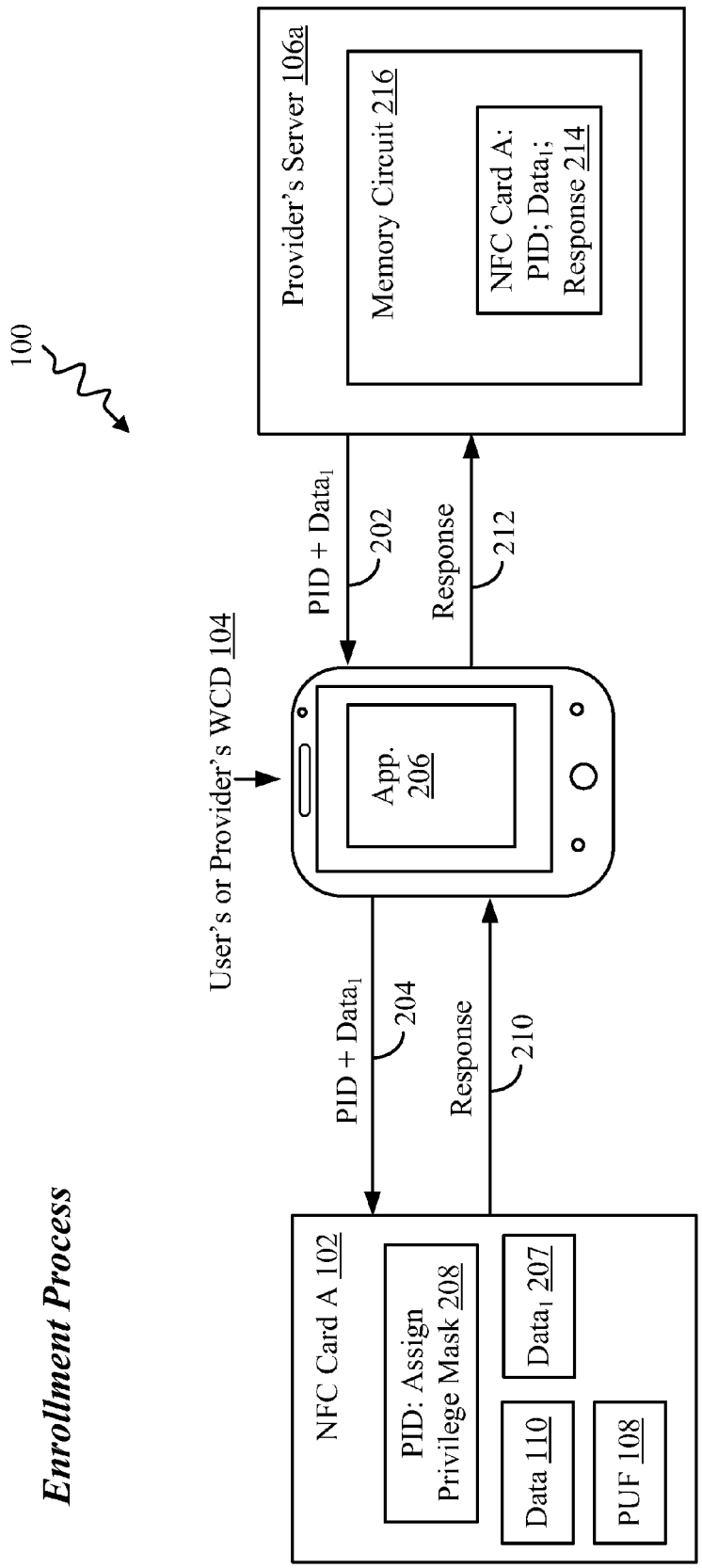
FIG. 2 illustrates a high level block diagram of an NFC infrastructure depicting an enrollment process.

FIG. 2 illustrates a high level block diagram of the NFC infrastructure 100 depicting an enrollment process according to one aspect. In the illustrated example, a user enrolls a provider into their NFC card 102 (e.g., NFC card A). Each provider enrolled onto the user's NFC card 102 is identified with a unique provider identification number (PID) so that the NFC card 102 can distinguish between providers and their level of secure data 110 access. During enrollment a server 106a associated with the provider may provide its PID to the NFC card 102. The server 106a may in some cases also provide additional data (e.g., $Data_1$). This may be accomplished by transmitting 202 the PID+$Data_1$ to the WCD 104, which in turn transmits 204 the PID+$Data_1$ to the NFC card 102 through NFC protocols. In the case where the WCD 104 belongs to or is otherwise associated with the user, an application 206 resident on the WCD 104 may be utilized by the user to have the WCD 104 receive 202 the PID+$Data_1$ from the server 106a and transmit 204 the PID+$Data_1$ to the user's NFC card 102. In another case, the user may approach the WCD 104 located at and associated with the provider for their NFC card 102 to receive 204 the PID+$Data_1$.

Once the NFC card 102 has received 204 the PID+$Data_1$, the NFC card 102 may store 207 this data. It then assigns and associates 208 a privilege mask (e.g., security mask) with the PID. In one aspect, the NFC card 102 and the provider's server 106a together agree upon the privilege mask to be assigned and associated 208 with the PID. The privilege mask helps define the specific data 110 that may be provided to the provider and its server 106a when, for example, the provider later attempts to access the data 110 stored on the NFC card 102.

Depending on the privilege mask assigned 208 at the NFC card 102 for a given provider, the NFC card 102 generates and transmits 210 one or more responses of varying complexity and security back to the provider's server 106a. As will be described in greater detail below, in one aspect the response may simply provide a user identification (UID) number associated with the NFC card 102 back to the server 106a in response to reception 204 of the provider's PID. In other aspects, the security and complexity of the response (or a set of responses) may increase and incorporate, for example, responses to challenges generated by the NFC card's PUF 108.

Notwithstanding the specific response protocol mandated by the privilege mask, the response may be transmitted 210, 212 to the provider's server 106a from the NFC card 102 via the WCD 104. As before, if the WCD 104 belongs to or is otherwise associated with the user, the user may utilize an application 206 on the WCD 104 to receive 210 and transmit 212 the NFC card's 102 response to the server 106a. The server 106a may then store 214 the response received from the NFC card 102 in a memory circuit 216. The server 106a may store a different response received from each and every NFC card it enrolls in. Thus, the server 106a stores 214 an entry that identifies the identity of the NFC card enrolled and its corresponding response. The server 106a may also store the PID+$Data_1$ sent 204 to the NFC card 102. According to one aspect, the memory circuit 216 may be any type of non-volatile storage medium including, but not limited to, flash memory, magnetic storage devices, solid state drives, optical storage devices, tapes, etc.

Figure 3:
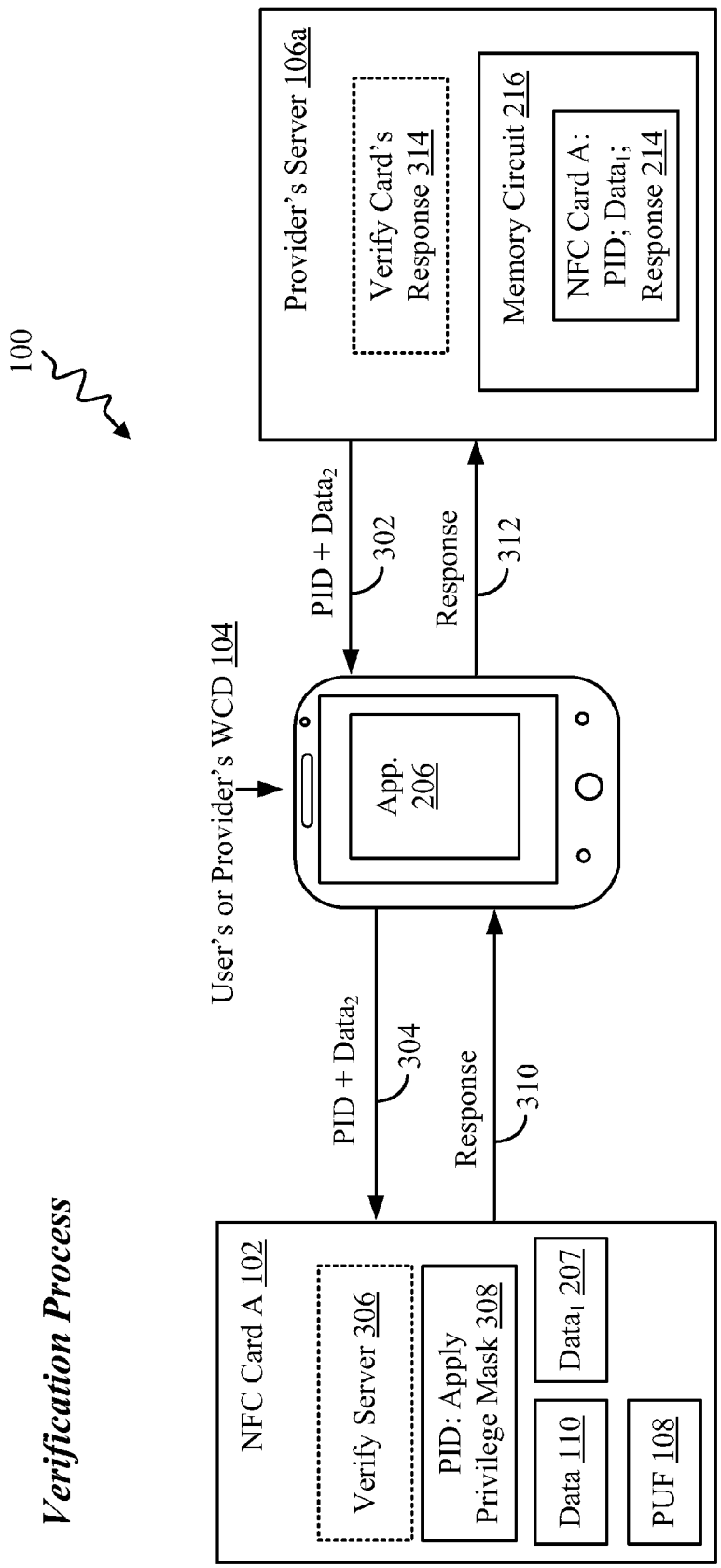
FIG. 3 illustrates a high level block diagram of an NFC infrastructure depicting a verification process.

FIG. 3 illustrates a high level block diagram of the NFC infrastructure 100 depicting a verification process according to one aspect. In the illustrated example, data 110 on an NFC card 102 is provided to a previously enrolled provider after optionally verifying the authenticity of the provider and/or the user's NFC card 102. During the verification process a server 106a associated with the provider may provide its PID in addition to some data (e.g., $Data_2$) to the NFC card 102. This may be accomplished by transmitting 302 the PID+$Data_2$ to the WCD 104, which in turn transmits 304 the PID+$Data_2$ to the NFC card 102 through NFC protocols. In the case where the WCD 104 belongs to or is otherwise associated with the user, an application 206 resident on the WCD 104 may be utilized by the user to have the WCD 104 receive 302 the PID+$Data_2$ from the server 106a and transmit 304 the PID+$Data_2$ to the user's NFC card 102. In another case, the user may approach the WCD 104 located at and associated with the provider for their NFC card 102 to receive 304 the PID+$Data_2$.

Once the NFC card 102 has received 304 the PID+$Data_2$, the NFC card 102 may optionally verify 306 the server 106a based on the PID and/or $Data_2$. This may be accomplished by performing operations and making comparisons to previously stored data (e.g., PID and $Data_1$) associated with the server 106a. Assuming the NFC card 102 verifies 306 the authenticity of the server 106a, the NFC card 102 applies 308 the privilege mask associated with the provider and/or server 106a based on the PID. Depending on the privilege mask applied 308, the NFC card 102 generates and transmits 310 one or more responses of varying complexity and security back to the provider's server 106a. As will be described in greater detail below, in one aspect the response may simply provide a user identification (UID) number associated with the NFC card 102 back to the server 106a in response to reception 304 of the provider's PID+$Data_2$. In other aspects, the security and complexity of the one or more responses may increase and incorporate, for example, responses to challenges generated by the NFC card's PUF 108.

Notwithstanding the specific response protocol mandated by the privilege mask, the response may be transmitted 310, 312 to the provider's server 106a from the NFC card 102 via the WCD 104. As before, if the WCD 104 belongs to or is otherwise associated with the user, the user may utilize an application 206 on the WCD 104 to receive 310 and transmit 312 the NFC card's 102 response to the server 106a. The server 106a may then optionally verify 314 the response received from the NFC card 102 by, for example, comparing it to previously acquired response(s) stored 214 in its memory circuit 216. Thus, if the response received 312 at the server 106a during verification matches previously stored 214 response data associated with the NFC card 102 (e.g., NFC card A), then the NFC card 102 may be authenticated and data 110 retrieved from the NFC card 102 may be trusted.

Figure 4:
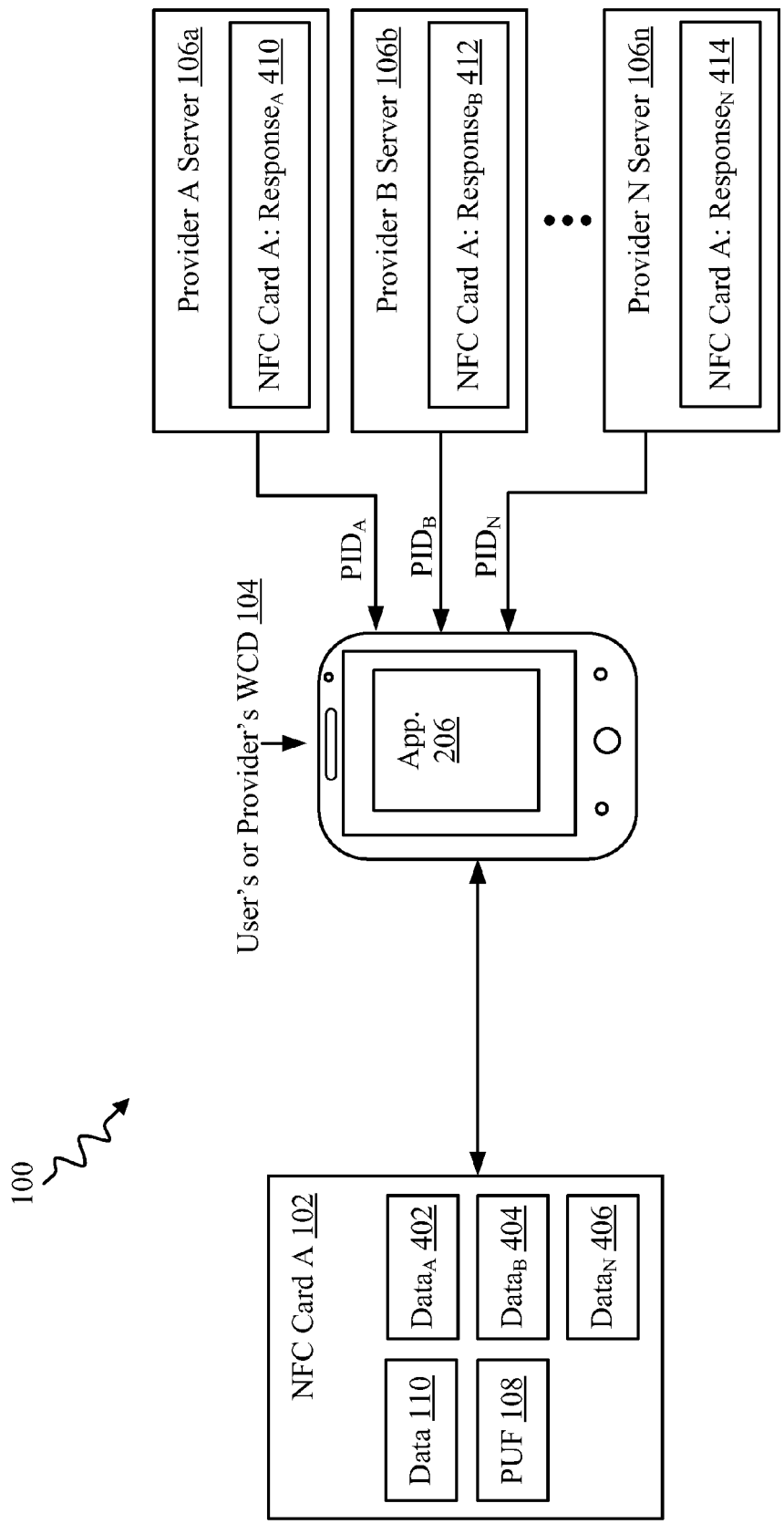
FIG. 4 illustrates a high level schematic block diagram of an NFC infrastructure.

FIG. 4 illustrates a high level schematic block diagram of the NFC infrastructure 100 according to one aspect. The illustrated example shows how each of the plurality of providers' servers 106a, 106b . . . 106n may transmit different PIDs (e.g., $PID_A$, $PID_B$, $PID_N$) that uniquely identify them in order to enroll and verify with the NFC card 102 (e.g., NFC card A). In this fashion multiple providers may enroll in the system using their unique PID. The NFC card 102 may store data 402, 404, 406 (e.g., PID information and other data) associated with each of the enrolled providers' servers 106a, 106b . . . 106n. Each server 106a, 106b . . . 106n may store the unique response 410, 412, 414 generated by the NFC card 102 in response to the PID and other data supplied to the NFC card 102. These responses 410, 412, 414 are stored so that the servers 106a, 106b . . . 106n may later verify the authenticity of the NFC card 102. The servers 106a, 106b . . . 106n may store the responses of each and every different NFC card they've enrolled with. The WCD 104 may act as a communication conduit between the servers 106a, 106b . . . 106n and the NFC card 102.

Figure 5:
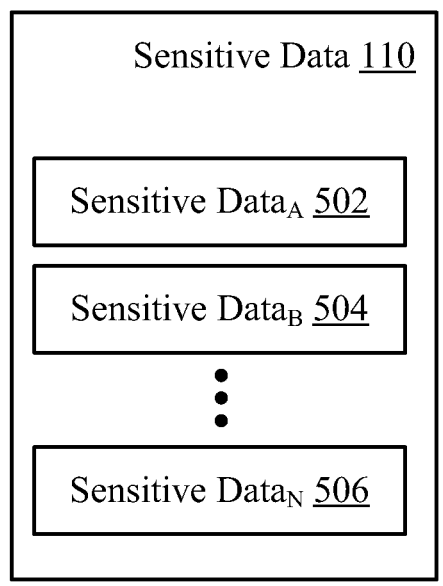
FIG. 5 illustrates a schematic block diagram of the sensitive data stored at an NFC card.

FIG. 5 illustrates a schematic block diagram of the sensitive data 110 stored at the NFC card 102 according to one aspect of the disclosure. The sensitive data 110 may be apportioned according to privilege masks such that only portions of it are designated as being available to and/or associated with one or more providers and/or their servers. For example, referring to FIGS. 1, 4, and 5, a first provider sensitive data 502 may represent at least a portion of the sensitive data 110 stored at the NFC card 102 that can be made available to (e.g., transmitted to) a first provider's (e.g., provider A) server 106a according to a first privilege mask. The first provider sensitive data 502 may include, for instance, the NFC card user's name, age, and a photo of the user 116. Thus, at most only this information may be made available to and/or transmitted to the first provider's server 106a, assuming successful authentication of the NFC card 102 and/or the server 106a when necessary.

Similarly, a second provider sensitive data 504 may represent at least a portion of the sensitive data 110 stored at the NFC card 102 that can be made available to (e.g., transmitted to) a second provider's (e.g., provider B) server 106b according to a second privilege mask. The second provider sensitive data 504 may include, for instance, the NFC card user's 116 rewards program card/account number associated with the second provider. Thus, at most only this information may be made available to and/or transmitted to the second provider's server 106b, assuming successful authentication of the NFC card 102 and/or the server 106b when necessary. In this fashion, the sensitive data 110 may include N number of provider sensitive data 502, 504, 506 that is associated with N different providers and/or servers.

Figure 6:
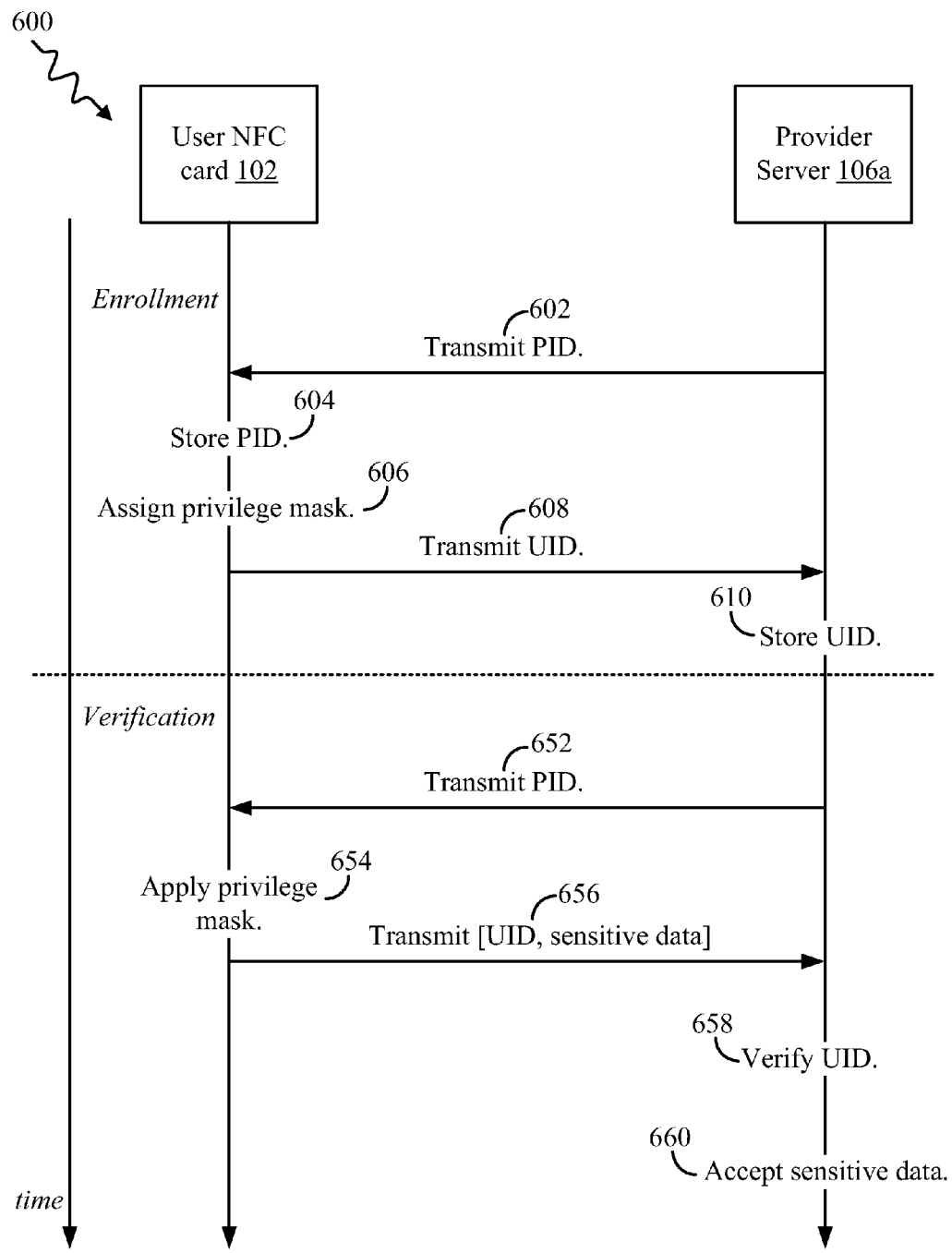
FIG. 6 illustrates a process flow diagram of a first exemplary security configuration for an NFC infrastructure.

FIG. 6 illustrates a process flow diagram of a first exemplary security configuration 600 for an NFC infrastructure according to one aspect. Referring to FIGS. 1, 5, and 6, the first security configuration 600 provides a first level of security for the NFC infrastructure 100 that includes simple identification of the NFC card 102 and the server 106a. The first security configuration 600 is simple in that it doesn't necessarily provide cryptographic authentication of either the NFC card 102 or the server 106a.

The first security configuration's 600 enrollment process may begin with the provider's server 106a transmitting 602 its unique PID to the NFC card 102. The NFC card 102 may then store 604 the PID received and assign 606 a privilege mask associated with the PID. The privilege mask helps define the portion of the sensitive data 110 that is the provider sensitive data (e.g., the first provider sensitive data 502) that may be provided to the server 106a when, for example, the server 106a later attempts to access sensitive data 110 stored on the NFC card 102. According to one aspect, the NFC card 102 and the server 106a negotiate the privilege mask to be assigned before the NFC card 102 assigns it. This may include the server 106a transmitting a privilege mask request to the NFC card 102 that indicates a desired level of access to certain types of sensitive data 110 stored on the NFC card 102. The NFC card 102, however, may ultimately decide whether or not to grant the server's 106a request and which privilege mask to assign 606 to its PID. In this fashion, the NFC card 102 may control what sensitive data is included in the provider sensitive data 502 that the server 106a may later access after verification. After the privilege mask is assigned 606, the NFC card 102 transmits 608 the user identification (UID) number associated with the NFC card 102 to the server 106a. The UID is a unique number or value that uniquely identifies the NFC card 102. The server 106a then stores 610 the UID associated with the NFC card 102.

The first security configuration's 600 verification process may begin with the provider's server 106a transmitting 652 its PID to the NFC card 102. The NFC card 102 may then look up the privilege mask settings associated with the PID received and apply 654 the privilege mask associated with the PID. The NFC card 102 then transmits 656 its user identification (UID) number and the first provider sensitive data 502 associated with the provider and/or server 106a to the server 106a. The server 106a then verifies 658 that it indeed has a UID value stored that matches the UID received from the NFC card 102. Assuming it does, the server 106a may then accept 660 the first provider sensitive data 502 received.

Figure 7A:
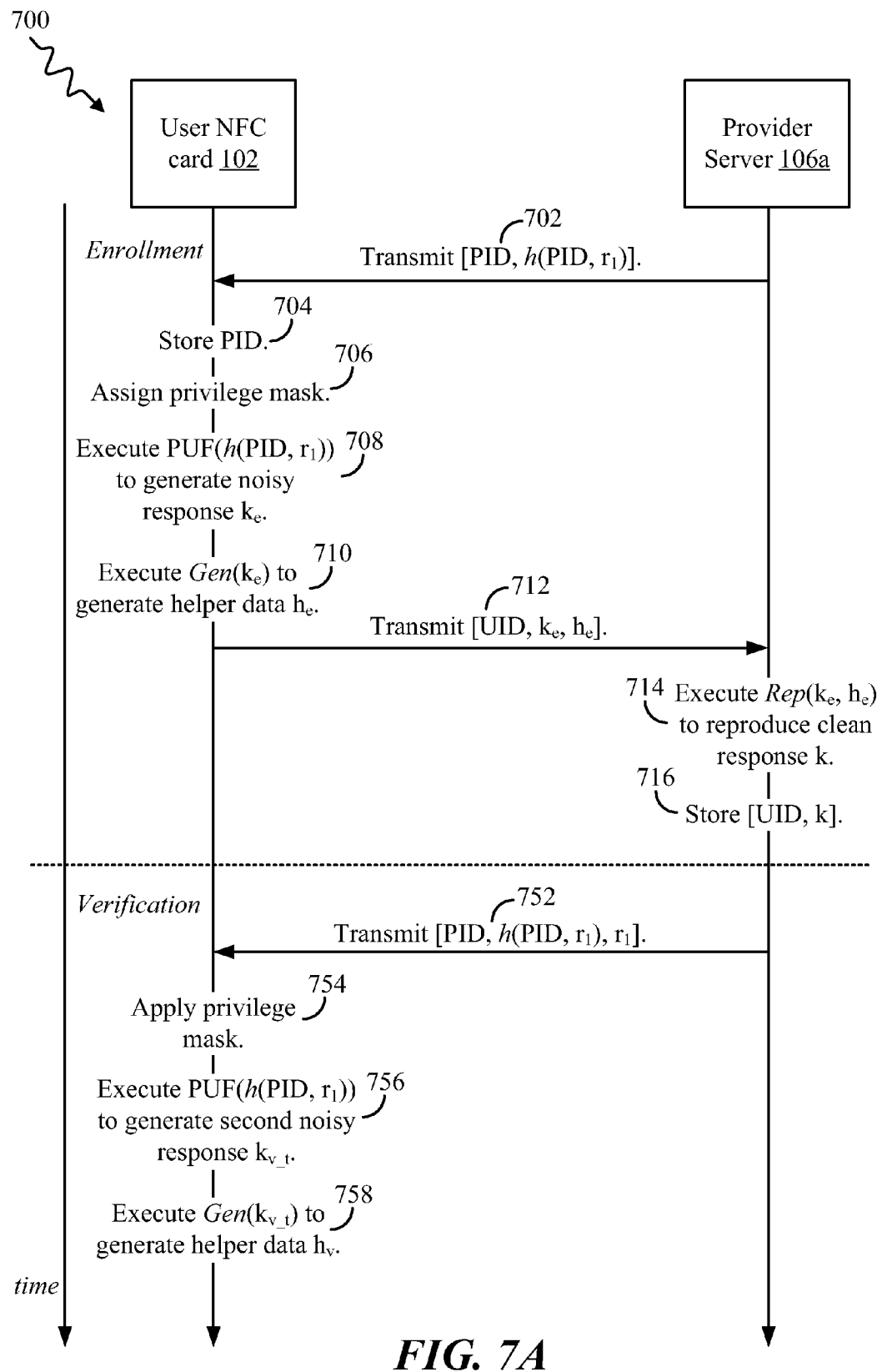
FIGS. 7A and 7B illustrate a process flow diagram of a second exemplary security configuration for an NFC infrastructure.
Figure 7B:
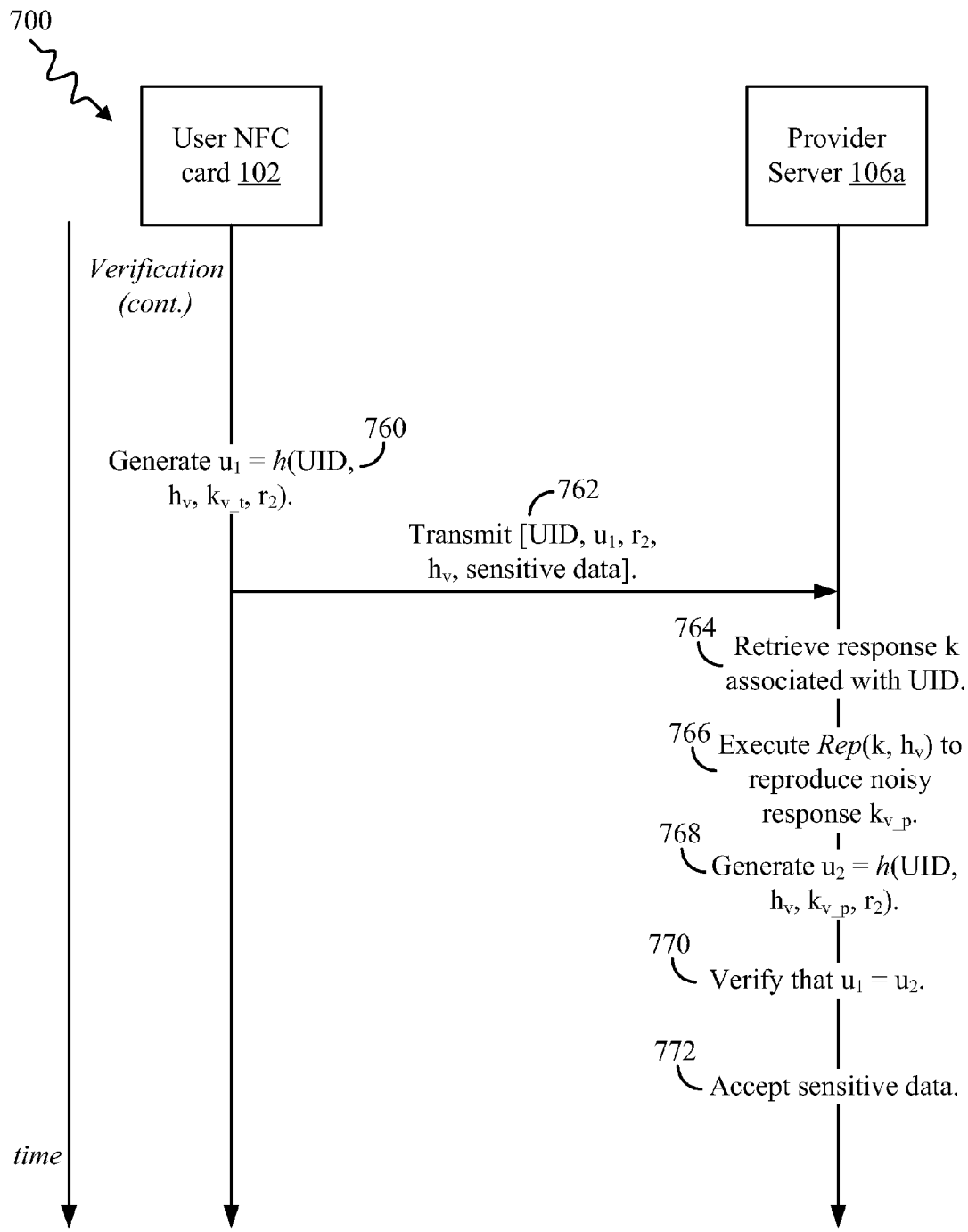

FIGS. 7A and 7B illustrate a process flow diagram of a second exemplary security configuration 700 for an NFC infrastructure according to one aspect. Referring to FIGS. 1, 5, 7A, and 7B, the second security configuration 700 provides a second level of security for the NFC infrastructure 100. Specifically, the second security configuration 700 allows the server 106a to cryptographically authenticate the NFC card 102 to help determine the NFC card's 102 identity.

The second security configuration's 700 enrollment process may begin with the provider's server 106a transmitting 702 a message to the NFC card 102 that includes its PID, and a hash (hash function denoted herein has h( )) of the PID and a first random number $r_1$ (i.e., $h(PID, r_1)$). The NFC card 102 may then store 704 the PID received and assign 706 a privilege mask associated with the PID. According to one aspect, the NFC card 102 and the server 106a negotiate the privilege mask assigned (e.g., server 106a transmits a privilege mask request indicating the desired level of access to sensitive data). After the privilege mask is assigned 706, the NFC card 102 executes 708 its PUF 108 with $h(PID, r_1)$ as the challenge thereby generating a noisy response $k_e$. The response $k_e$ is noisy in that it is different to some degree from the expected, clean (i.e., non-noisy) response k due to noise (e.g., thermal, electrical, etc.) associated with the NFC card 102 and/or the PUF 108 device itself. Thus, ideally the PUF 108 would generate the response k to the challenge h(PID, $r_1$) but due to noise the PUF actually generates the noisy response $k_e$. However, as is known in the art, helper data may be generated using helper data generation functions (denoted herein as Gen( )) to enable reproduction of the clean PUF response based on the noisy response.

After the NFC card 102 generates the noisy response $k_e$, the NFC card 102 executes 710 Gen($k_e$) to generate helper data $h_e$. The NFC card 102 may then transmit 712 a message to the server 106a that includes its UID, the noisy response $k_e$, and the helper data $h_e$. The server 106a may then execute a reproduction function (denoted herein as Rep( )) to reproduce the clean response k from the noisy response $k_e$ using the helper data $h_e$. Thus, the server 106a may execute 714 Rep($k_e$, $h_e$) to generate the clean response k. The server 106a may then store 716 the UID and the response k.

The second security configuration's 700 verification process may begin with the provider's server 106a transmitting 752 a message to the NFC card 102 that includes PID, h(PID, $r_1$), and $r_1$. The NFC card 102 may then look up the privilege mask settings associated with the PID received and apply 754 the privilege mask associated with the PID. The NFC card 102 may then execute 756 its PUF 108 with h(PID, $r_1$) as the challenge thereby generating an NFC target-generated second noisy response $k_{v\_t}$. The second noisy response $k_{v\_t}$ is different than the first noisy response $k_e$ even though the challenge (h(PID, $r_1$)) is the same due to the unpredictable nature of noise. The NFC card 102 then executes 758 Gen($k_{v\_t}$) to generate helper data $h_v$ associated with the target-generated second noisy response $k_{v\_t}$.

The NFC card 102 may also generate a value $u_1$ that is equal to h(UID, $h_v$, $k_{v\_t}$, $r_2$) where $r_2$ is a second random number different than $r_1$. A message including the UID, $u_1$, $r_2$, $h_v$, and the first provider sensitive data 502 associated with the provider and/or server 106a is then transmitted 762 from the NFC card 102 to the server 106a.

The server 106a may then retrieve 764 the previously stored clean response k associated with the UID value received, and execute 766 the Rep(k, $h_v$) to reproduce a provider-generated second noisy response $k_{v\_p}$. The target-generated second noisy response $k_{v\_t}$ and the provider-generated second noisy response $k_{v\_p}$ should be the same if the NFC card 102 and the server 106a are both the same devices that took part in the enrollment process with each other (i.e., neither one is being impersonated by a different device). The server 106a then generates 768 $u_2$=h(UID, $h_v$, $k_{v\_p}$, $r_2$) using the provider-generated second noisy response $k_{v\_p}$ that it reproduced 766 earlier to verify 770 whether the value $u_1$ it received from the NFC card 102 matches (e.g., equals) the value $u_2$ it generated. If $u_1$=$u_2$ then the NFC card 102 is authenticated by the server 106a and the server 106a can reliably accept 772 the first provider sensitive data 502 received.

Figure 8A:
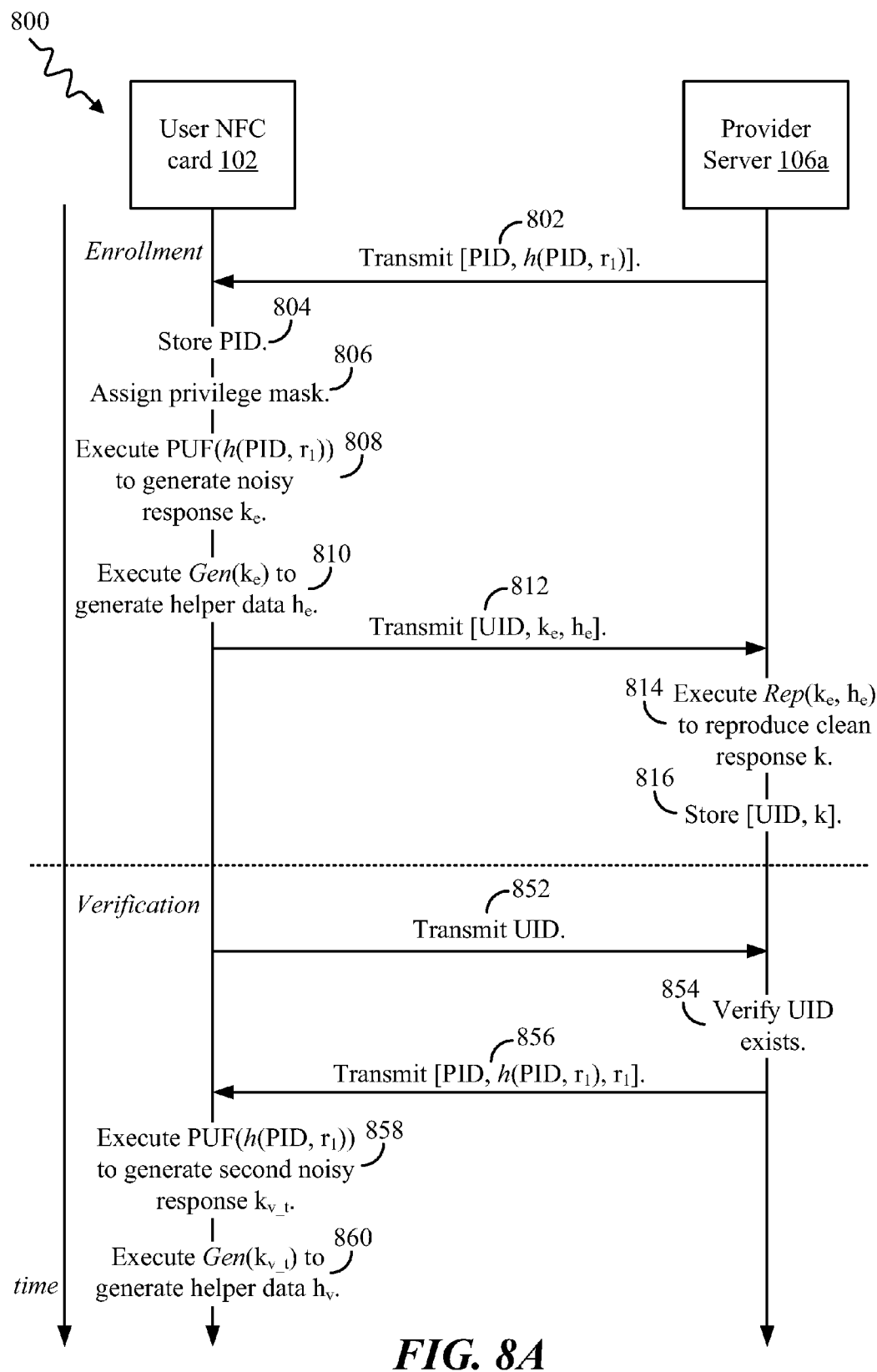
FIGS. 8A and 8B illustrate a process flow diagram of a third exemplary security configuration for an NFC infrastructure.
Figure 8B:
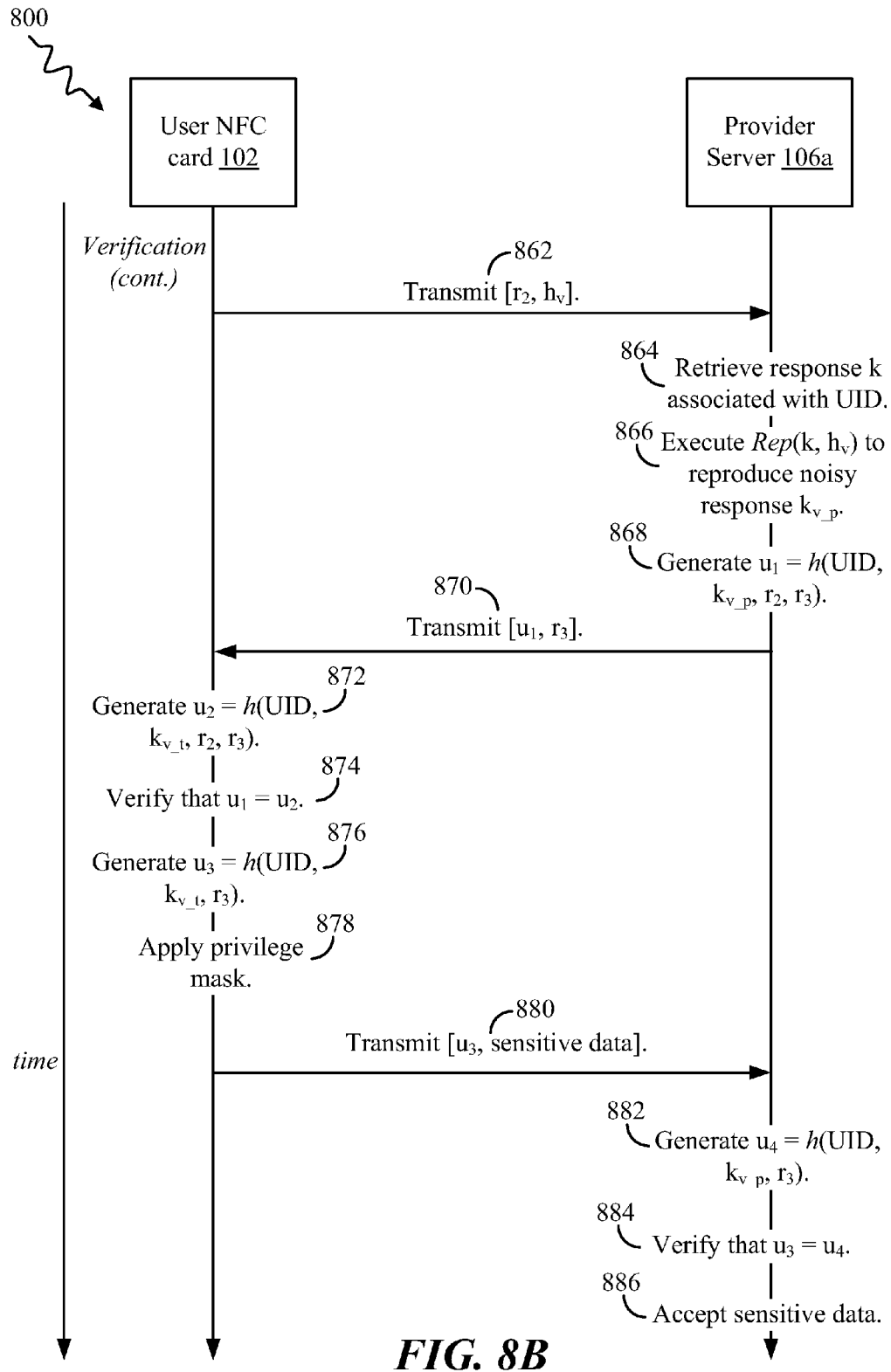

FIGS. 8A and 8B illustrate a process flow diagram of a third exemplary security configuration 800 for an NFC infrastructure according to one aspect. Referring to FIGS. 1, 5, 8A, and 8B, the third security configuration 800 provides a third level of security for the NFC infrastructure 100. Specifically, the third security configuration 800 allows the server 106a and the NFC card 102 to cryptographically authenticate each other.

The third security configuration's 800 enrollment process may begin with the provider's server 106a transmitting 802 a message to the NFC card 102 that includes its PID and h(PID, $r_1$) where $r_1$ is a first random number generated and stored at the server 106a. The NFC card 102 may then store 804 the PID received and assign 806 a privilege mask associated with the PID. According to one aspect, the NFC card 102 and the server 106a negotiate the privilege mask assigned (e.g., server 106a transmits a privilege mask request indicating the desired level of access to sensitive data). After the privilege mask is assigned 806, the NFC card 102 executes 808 its PUF 108 with h(PID, $r_1$) as the challenge thereby generating a noisy response $k_e$.

After the NFC card 102 generates the noisy response $k_e$, the NFC card 102 executes 810 Gen($k_e$) to generate helper data $h_e$. The NFC card 102 may then transmit 812 a message to the server 106a that includes its UID, the noisy response $k_e$ and the helper data $h_e$. The server 106a may then execute 814 Rep($k_e$, $h_e$) to generate the clean response k. The server 106a stores 816 the UID and the response k.

The third security configuration's 800 verification process may begin with the NFC card 102 transmitting 852 its UID to the server 106a. After verifying 854 that the UID exists (e.g., server 106a has an enrollment entry corresponding to the UID), the server 106a transmits 856 a message to the NFC card 102 that includes PID, h(PID, $r_1$), and $r_1$. The NFC card 102 may then execute 858 its PUF 108 with h(PID, $r_1$) as the challenge thereby generating a target-generated second noisy response $k_{v\_t}$. The target-generated second noisy response $k_{v\_t}$ is different than the first noisy response $k_e$. The NFC card 102 then executes 860 Gen($k_{v\_t}$) to generate helper data $h_v$ associated with the second noisy response $k_{v\_t}$, and transmits 862 a message including the helper data $h_v$ and a second random number $r_2$ (different than first random number $r_1$) to the server 106a.

The server 106a may then retrieve 864 the previously stored clean response k associated with the UID value received, and execute 866 the Rep(k, $h_v$) to reproduce a provider-generated second noisy response $k_{v\_p}$. The server 106a then generates 868 $u_1$=h(UID, $k_{v\_p}$, $r_2$, $r_3$) using the provider-generated second noisy response $k_{v\_p}$ that it reproduced 866 earlier. The third random number $r_3$ is another random number different than the first and second random numbers $r_1$, $r_2$. A message including $u_1$ and $r_3$ is then transmitted 870 to the NFC card 102.

The NFC card 102 then generates 872 $u_2$=h(UID, $k_{v\_t}$, $r_2$, $r_3$) using the target-generated second noisy response $k_{v\_t}$ that it previously generated 858, and verifies 874 whether the value $u_1$ it received from the server 106a matches (e.g., equals) the value $u_2$ it generated. Assuming $u_1$=$u_2$, the server 106a is authenticated and the NFC card 102 generates 876 $u_3$=h(UID, $k_{v\_t}$, $r_3$) and applies 878 the privilege mask associated with the server's 106a PID. The NFC card 102 then transmits 880 the value $u_3$ and the first provider sensitive data 502 associated with the provider and/or server 106a to the server 106a.

The server 106a then generates 882 $u_4$=h(UID, $k_{v\_p}$, $r_3$) using the provider-generated second noisy response $k_{v\_p}$, and verifies 884 whether the value $u_3$ that it received from the NFC card 102 matches (e.g., equals) the value $u_4$ it generated. Assuming $u_3$=$u_4$, the NFC card 102 is authenticated and the server 106a may reliably accept 886 the first provider sensitive data 502 received.

Figure 9:
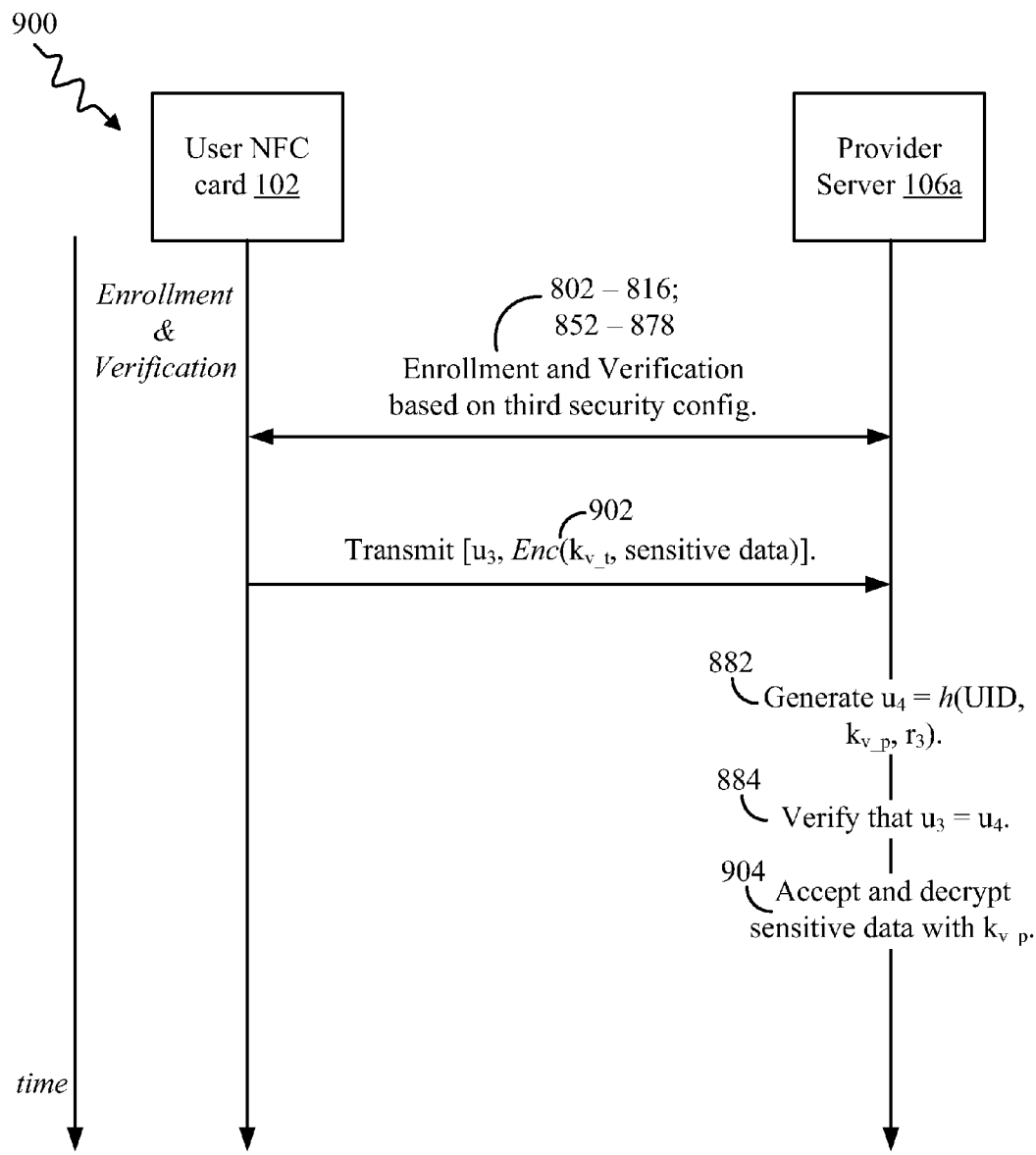
FIG. 9 illustrates a process flow diagram of a fourth exemplary security configuration for an NFC infrastructure.

FIG. 9 illustrates a process flow diagram of a fourth exemplary security configuration 900 for an NFC infrastructure according to one aspect. Referring to FIGS. 1, 5, 8A, 8B, and 9, the fourth security configuration 900 provides a fourth level of security for the NFC infrastructure 100 that builds upon the third security configuration 800. Like the third security configuration 800, the fourth security configuration also allows the server 106a and the NFC card 102 to cryptographically authenticate each other but has the added feature of encryption of the first provider sensitive data 502 transmitted to the server 106a from the NFC card 102.

For example, the fourth security configuration 900 includes mutual authentication of the NFC card 102 and the server 106a based on processes and communications 802, 804, 806, 808, 810, 812, 814, 816, 852, 854, 856, 858, 860, 862, 864, 866, 868, 870, 872, 874, 876, 878 of the third security configuration 800. As an additional measure of security, however, after applying 878 the privilege mask the NFC card 102 transmits 902 a message including the value $u_3$ and an encrypted (denoted by the function Enc( )) version of the first provider sensitive data 502 associated with the provider and/or server 106a. The first provider sensitive data 502 is encrypted using the target-generated second noisy response $k_{v\_t}$ as the key. After verifying 884 that the value $u_3 = u_4$, the server 106a accepts and decrypts 904 the sensitive data received using the provider-generated second noisy response $k_{v\_p}$ the server 106a previously generated 866. In one case, the NFC card 102 may encrypt the entire message transmitted 902 using the target-generated second noisy response $k_{v\_t}$ as the key. In such a case the server 106a decrypts the received message first using its provider-generated second noisy response $k_{v\_p}$ before generating $u_4$ and verifying that $u_3 = u_4$.

The examples illustrated in FIG. 6-9 show communication exchanges between an NFC card 102 and a provider's server 106a. Although these communication exchanges are shown as occurring directly between the NFC card 102 and the server 106a, in some aspects a WCD 104 (see FIGS. 1-4) may act as an communication intermediary between the NFC card 102 and the server 106a (e.g., transmitting/receiving data to/from the NFC card 102 using NFC and transmitting/receiving data to/from the server 106a using long or short range communication protocols). In other aspects the server 106a may have an NFC interface itself and thus may communicate directly with the NFC card 102 using NFC.

Figure 10:
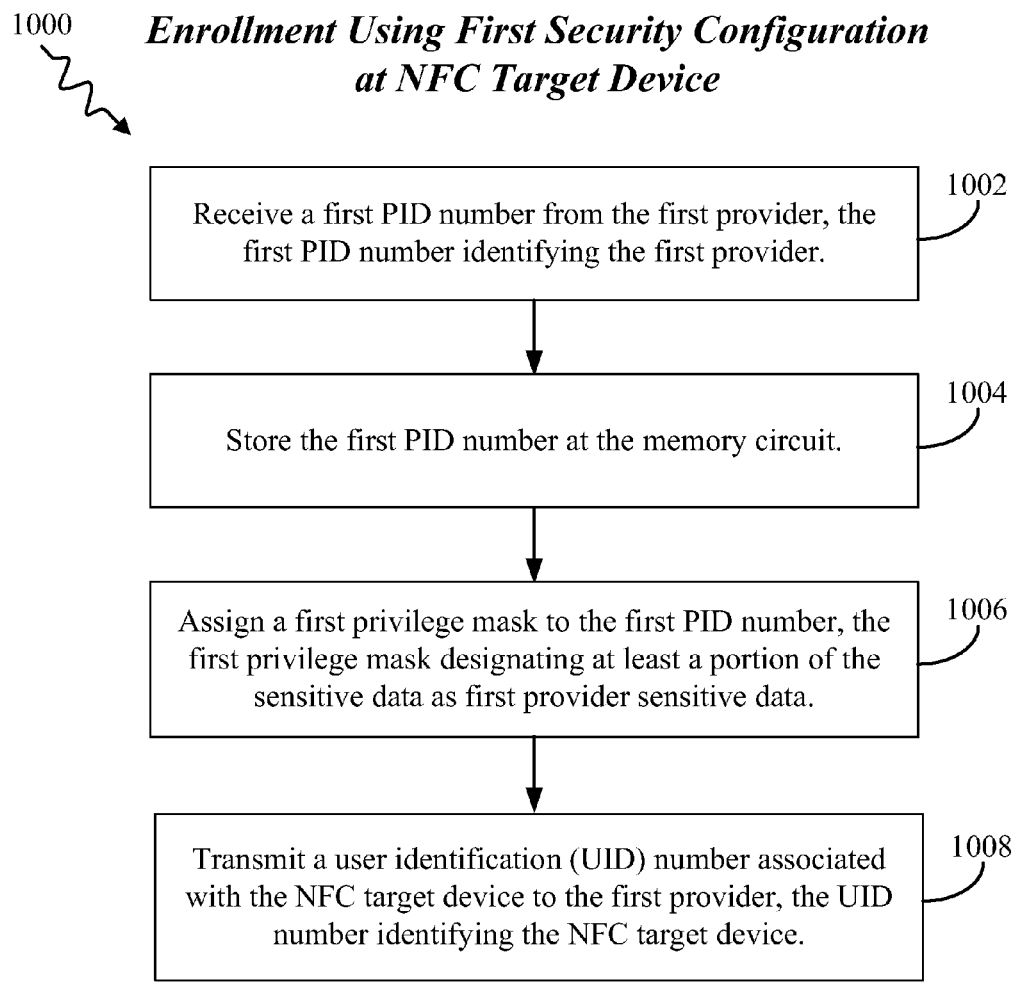
FIG. 10 illustrates a process flow diagram of an enrollment process taking place at the NFC target device based on the first security configuration.

FIG. 10 illustrates a process flow diagram 1000 of an enrollment process taking place at the NFC target device 102 based on the first security configuration 600 according to one aspect of the disclosure. First, the NFC target device receives a first PID number from a first provider, where the first PID number identifies the first provider 1002. Next, the NFC target device stores the first PID number at a memory circuit 1004. Then, the target device assigns a first privilege mask to the first PID number, where the first privilege mask designates at least a portion of the sensitive data as first provider sensitive data 1006. Next, the NFC target device transmits a user identification (UID) number associated with the NFC target device to the first provider, where the UID number identifies the NFC target device 1008.

Figure 11:
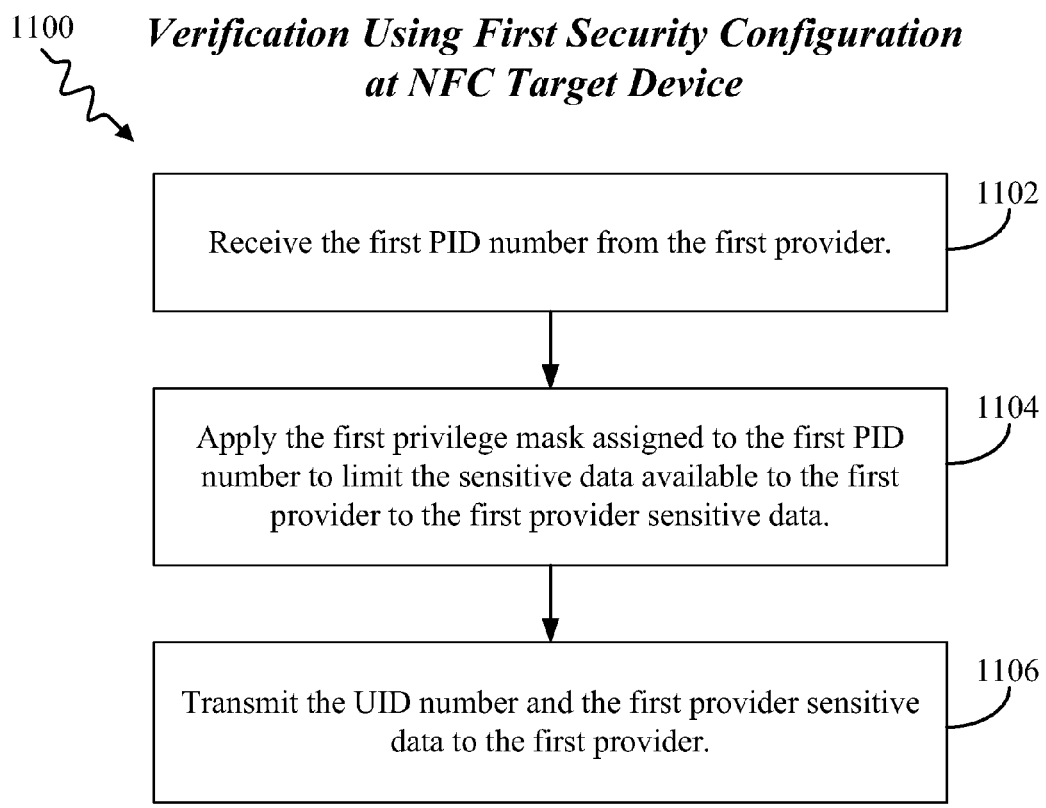
FIG. 11 illustrates a process flow diagram of a verification process taking place at the NFC target device based on the first security configuration.

FIG. 11 illustrates a process flow diagram 1100 of a verification process taking place at the NFC target device 102 based on the first security configuration 600 according to one aspect of the disclosure. First, the NFC target device receives the first PID number from the first provider 1102. Next, the device applies the first privilege mask assigned to the first PID number to limit the sensitive data available to the first provider to the first provider sensitive data 1104. Then, the target device transmits the UID number and the first provider sensitive data to the first provider 1106.

Figure 12:
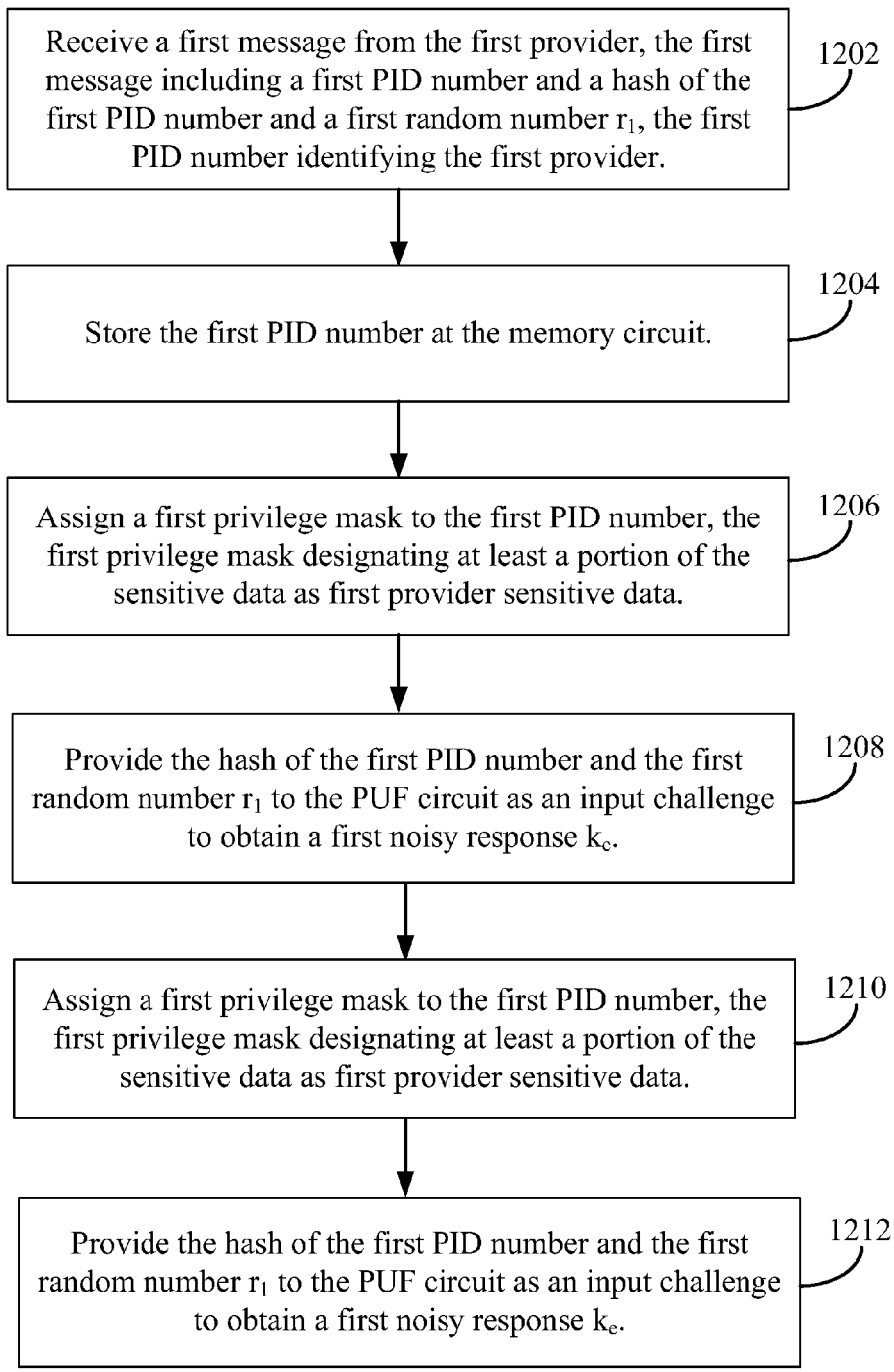
FIG. 12 illustrates a process flow diagram of an enrollment process taking place at the NFC target device based on the second security configuration.

FIG. 12 illustrates a process flow diagram 1200 of an enrollment process taking place at the NFC target device 102 based on the second security configuration 700 according to one aspect of the disclosure. First, the NFC target device receives a first message from a first provider, where the first message includes a first PID number and a hash of the first PID number and a first random number $r_1$, and the first PID number identifies the first provider 1202. Next, the NFC target device stores the first PID number at a memory circuit 1204. Then, the target device assigns a first privilege mask to the first PID number, where the first privilege mask designates at least a portion of the sensitive data as first provider sensitive data 1206. Next, the NFC target device provides the hash of the first PID number and the first random number $r_1$ to a PUF circuit as an input challenge to obtain a first noisy response $k_e$ 1208. Then, the target device executes a helper data generation function to generate helper data $h_e$ associated with the first noisy response $k_e$ 1210. Next, the target device transmits a second message to the first provider, the second message including a user identification (UID) number, the first noisy response $k_e$, and the helper data $h_e$, where the UID number identifies the NFC target device 1212.

FIG. 13 illustrates a process flow diagram 1300 of a verification process taking place at the NFC target device 102 based on the second security configuration 700 according to one aspect of the disclosure. First, the NFC target device receives a third message from the first provider, where the third message includes the first PID number, the first random number $r_1$, and the hash of the first PID number and the first random number $r_1$ 1302. Then, the target device applies the first privilege mask assigned to the first PID number to limit the sensitive data available to the first provider to the first provider sensitive data 1304. Next, the target device provides the hash of the first PID number and the first random number $r_1$ to the PUF circuit as an input challenge to obtain a target-generated second noisy response $k_{v\_t}$ 1306. Then, the target device executes the helper data generation function to generate helper data $h_v$ associated with the target-generated second noisy response $k_{v\_t}$ 1308. Next, the target device computes a value $u_1$ that includes a hash of the UID number, the helper data $h_v$, the target-generated second noisy response $k_{v\_t}$, and the second random number $r_2$ 1310. Then, the target device transmits a fourth message to the first provider, where the fourth message includes the UID number, the value $u_1$, the second random number $r_2$, the helper data $h_v$, and the first provider sensitive data 1312.

Figure 14A:
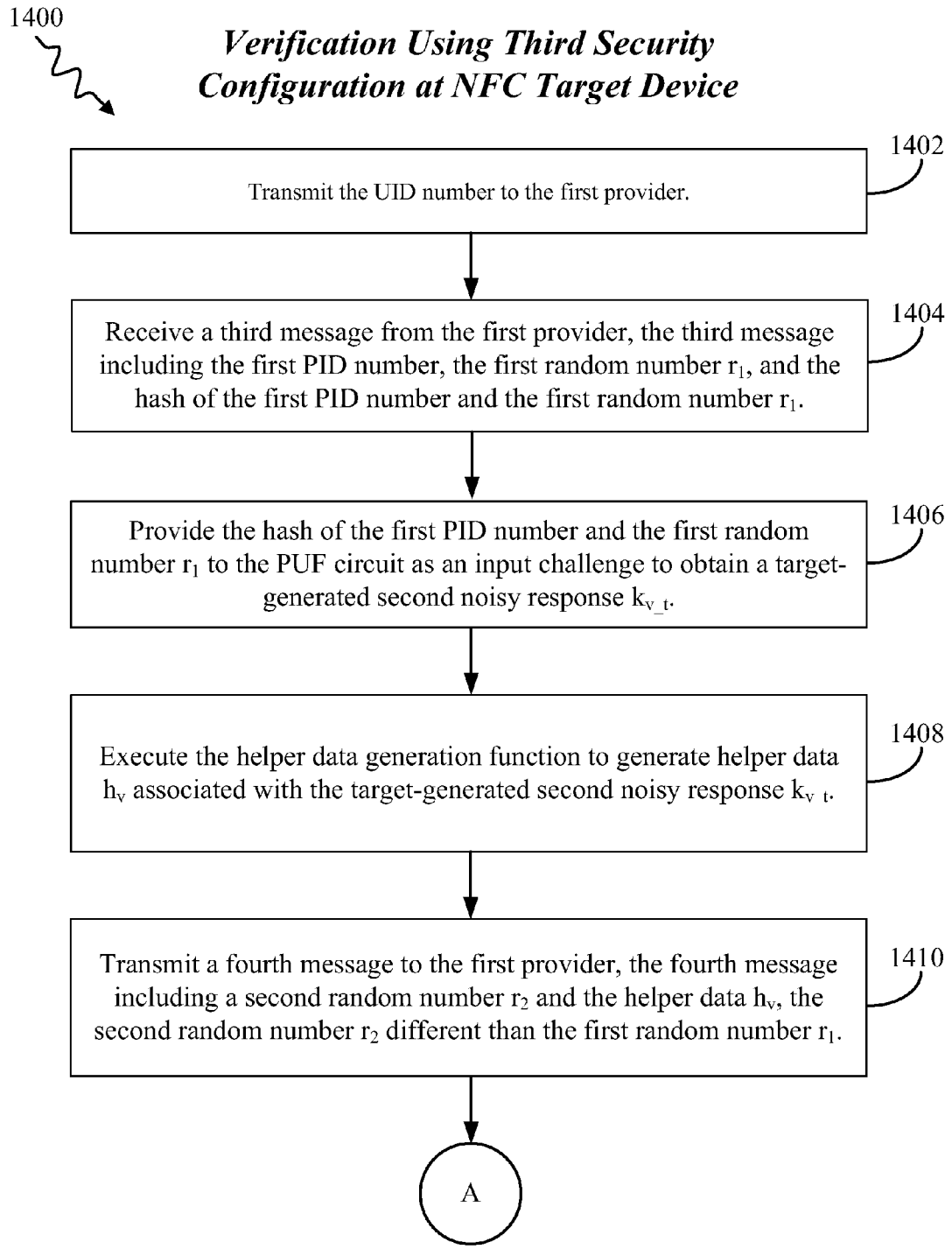
FIGS. 14A and 14B illustrate a process flow diagram of a verification process taking place at the NFC target device based on the third security configuration.
Figure 14B:
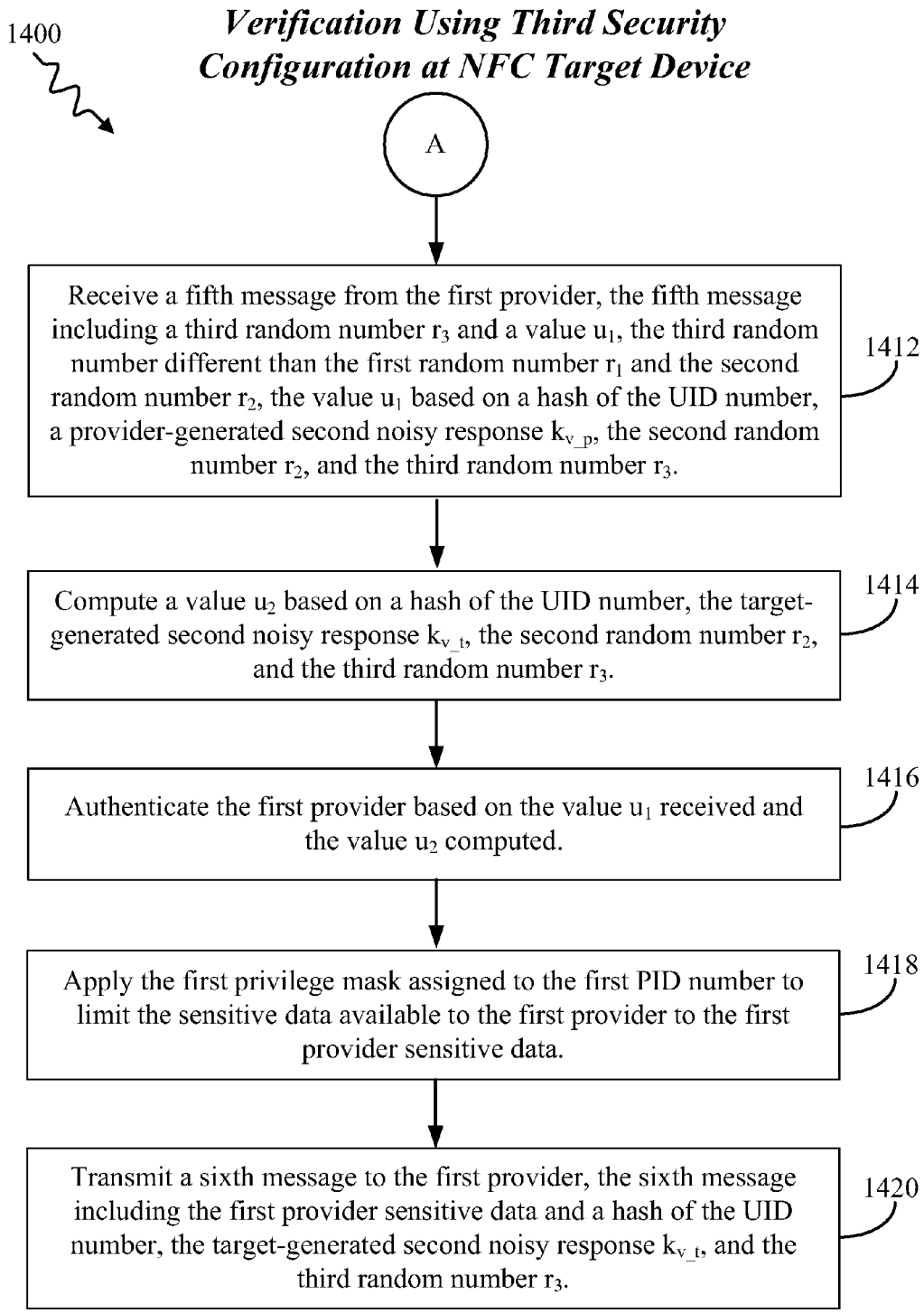

FIGS. 14A and 14B illustrate a process flow diagram 1400 of a verification process taking place at the NFC target device 102 based on the third security configuration 800 according to one aspect of the disclosure. First, the NFC target device transmits the UID number to the first provider 1402. Next, the target device receives a third message from the first provider, where the third message includes the first PID number, the first random number $r_1$, and the hash of the first PID number and the first random number $r_1$ 1404. Then, the target device provides the hash of the first PID number and the first random number $r_1$ to the PUF circuit as an input challenge to obtain a target-generated second noisy response $k_{v\_t}$ 1406. Next, the target device executes the helper data generation function to generate helper data $h_v$ associated with the target-generated second noisy response $k_{v\_t}$ 1408. Then, the target device transmits a fourth message to the first provider, where the fourth message includes a second random number $r_2$ and the helper data $h_v$, and the second random number $r_2$ is different than the first random number $r_1$ 1410. Next, the target device receives a fifth message from the first provider, where the fifth message includes a third random number $r_3$ and a value $u_1$, the third random number being different than the first random number $r_1$ and the second random number $r_2$, and the value $u_1$ is based on a hash of the UID number, a provider-generated second noisy response $k_{v\_p}$, the second random number $r_2$, and the third random number $r_3$ 1412.

Then, the target device computes a value $u_2$ based on a hash of the UID number, the target-generated second noisy response $k_{v\_t}$, the second random number $r_2$, and the third random number $r_3$ 1414. Next, the target device authenticates the first provider based on the value $u_1$ received and the value $u_2$ computed 1416. Then, the target device applies the first privilege mask assigned to the first PID number to limit the sensitive data available to the first provider to the first provider sensitive data 1418. Next, the target device transmits a sixth message to the first provider, where the sixth message includes the first provider sensitive data and a hash of the UID number, the target-generated second noisy response $k_{v\_t}$, and the third random number $r_3$ 1420.

Figure 15:
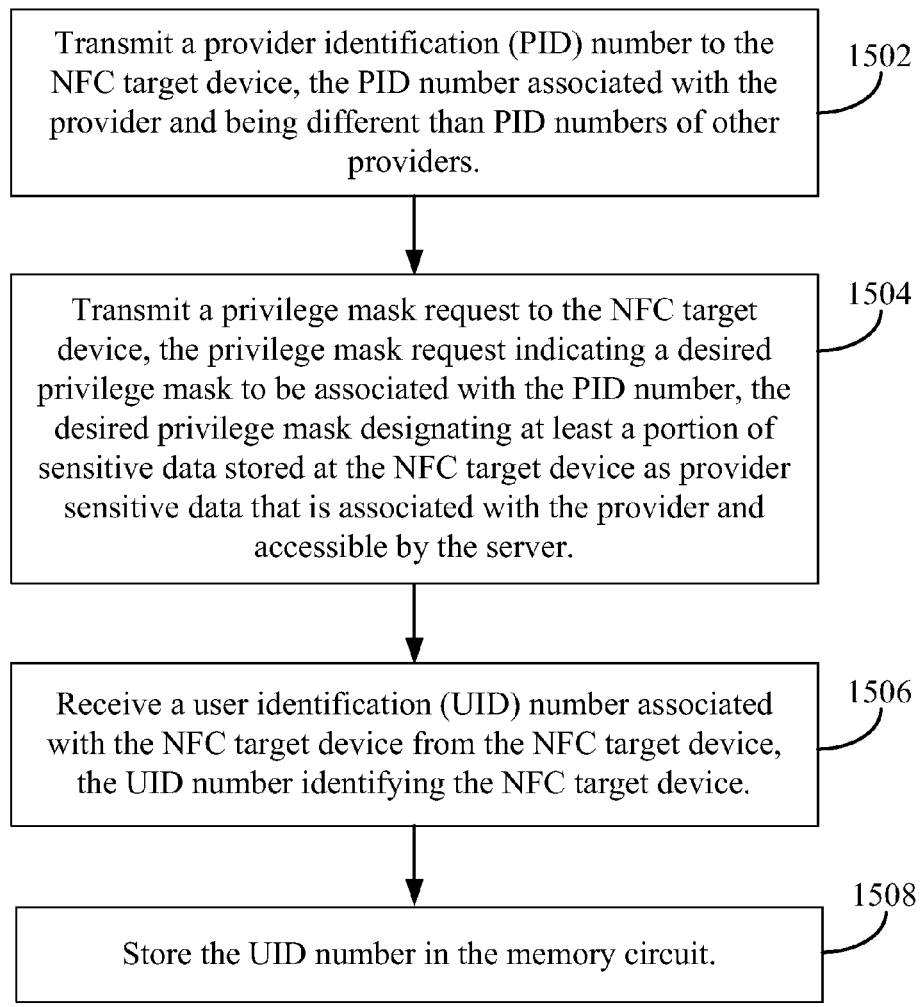
FIG. 15 illustrates a process flow diagram of an enrollment process taking place at the server based on the first security configuration.

FIG. 15 illustrates a process flow diagram 1500 of an enrollment process taking place at the server 106a based on the first security configuration 600 according to one aspect of the disclosure. First, the server transmits a provider identification (PID) number to a NFC target device, where the PID number is associated with a provider and is different than PID numbers of other providers 1502. Next, the server transmits a privilege mask request to the NFC target device, where the privilege mask request indicates a desired privilege mask to be associated with the PID number, the desired privilege mask designating at least a portion of sensitive data stored at the NFC target device as provider sensitive data that is associated with the provider and accessible by the server 1504. Then, the server receives a user identification (UID) number associated with the NFC target device from the NFC target device, where the UID number identifies the NFC target device 1506. Next, the server stores the UID number in a memory circuit 1508.

Figure 16:
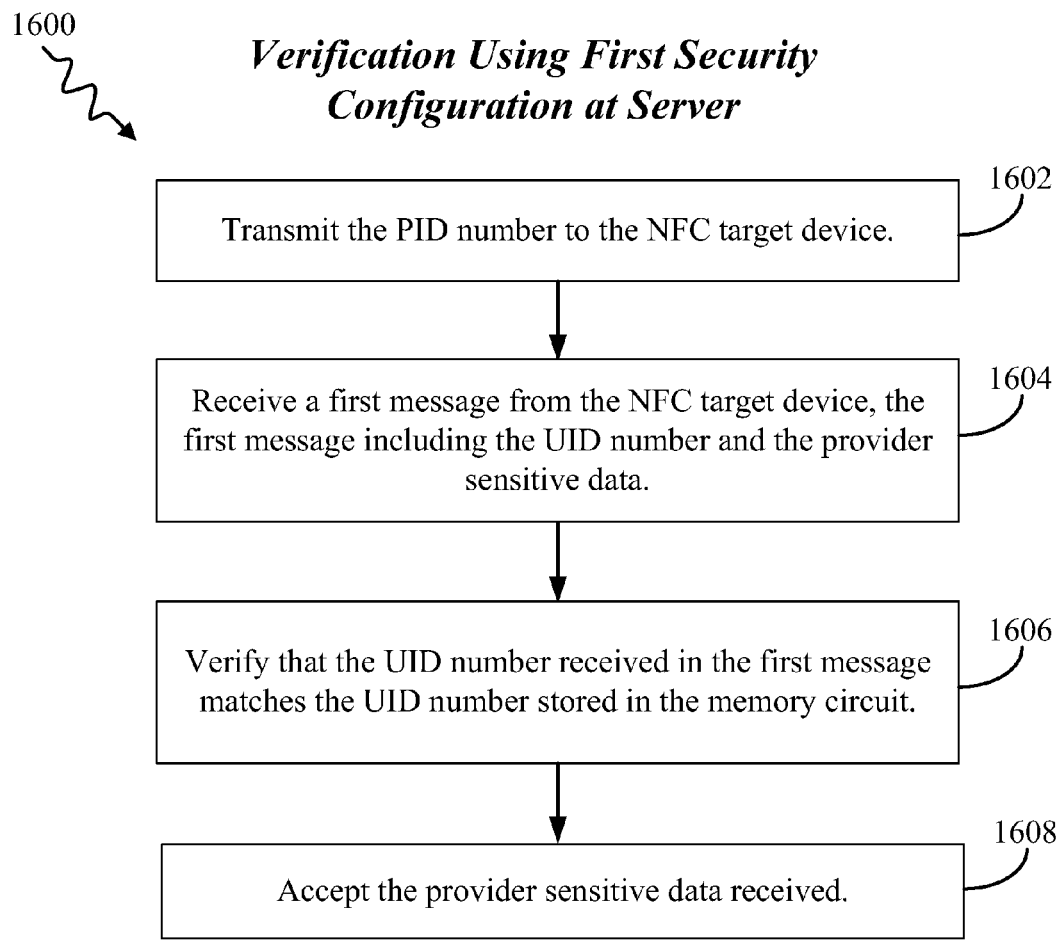
FIG. 16 illustrates a process flow diagram of a verification process taking place at the server based on the first security configuration.

FIG. 16 illustrates a process flow diagram 1600 of a verification process taking place at the server 106a based on the first security configuration 600 according to one aspect of the disclosure. First, the server transmits the PID number to the NFC target device 1602. Next, the server receives a first message from the NFC target device, where the first message includes the UID number and the provider sensitive data 1604. Then, the server verifies that the UID number received in the first message matches the UID number stored in the memory circuit 1606. Next, the server accepts the provider sensitive data received 1608.

Figure 17:
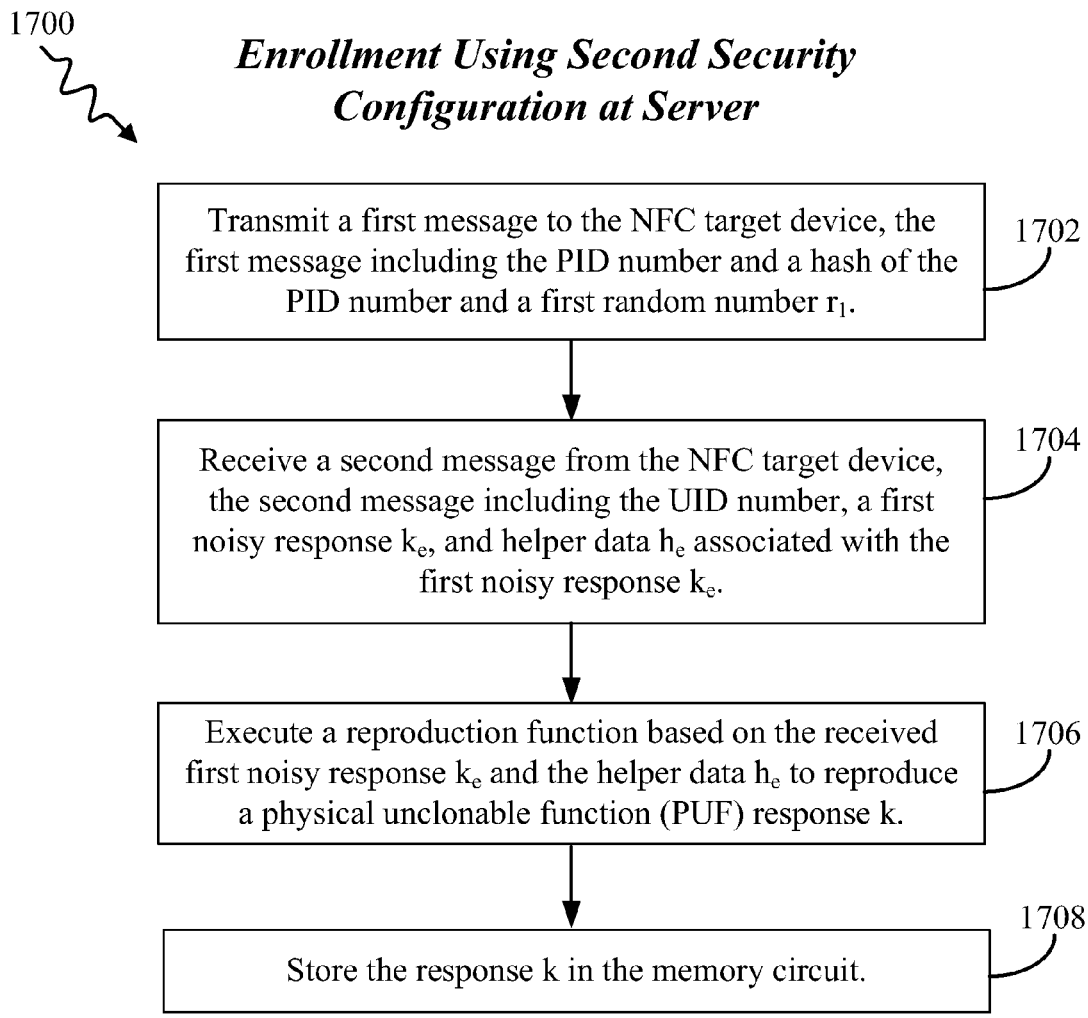
FIG. 17 illustrates a process flow diagram of an enrollment process taking place at the server based on the second security configuration.

FIG. 17 illustrates a process flow diagram 1700 of an enrollment process taking place at the server 106a based on the second security configuration 700 according to one aspect of the disclosure. First, the server transmits a first message to an NFC target device, where the first message includes a PID number and a hash of the PID number and a first random number $r_1$ 1702. Next, the server receives a second message from the NFC target device, where the second message includes the UID number, a first noisy response $k_e$, and helper data $h_e$ that is associated with the first noisy response $k_e$ 1704. Then, the server executes a reproduction function based on the received first noisy response $k_e$ and the helper data $h_e$ to reproduce a physical unclonable function (PUF) response k 1706. Next, the server stores the response k in a memory circuit 1708.

Figure 18B:
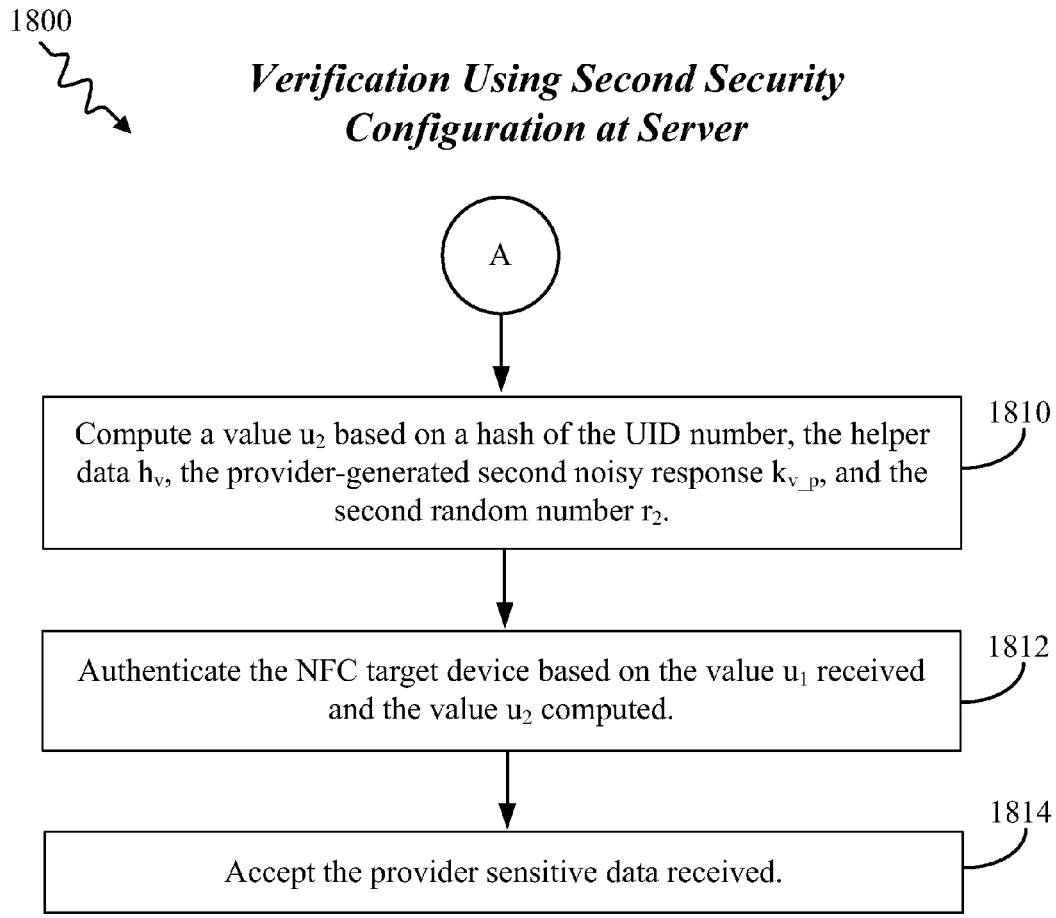

FIGS. 18A and 18B illustrate a process flow diagram 1800 of a verification process taking place at the server 106a based on the second security configuration 700 according to one aspect of the disclosure. First, the server transmits a third message to the NFC target device, where the third message includes the PID number, the first random number $r_1$, and the hash of the PID number and the first random number $r_1$ 1802. Then, the server receives a fourth message from the NFC target device, where the fourth message includes the UID number, a value $u_1$, a second random number $r_2$ different than the first random number $r_1$, helper data $h_v$ associated with a target-generated second noisy response $k_{v\_t}$, and the provider sensitive data 1804. Next, the server obtains the PUF response k based on the UID number of the NFC target device 1806. Then, the server executes the reproduction function based on the PUF response k and the helper data $h_v$ to reproduce a provider-generated second noisy response $k_{v\_p}$ 1808. Next, the server computes a value $u_2$ based on a hash of the UID number, the helper data $h_v$, the provider-generated second noisy response $k_{v\_p}$, and the second random number $r_2$ 1810. Then, the server authenticates the NFC target device based on the value $u_1$ received and the value $u_2$ computed 1812. Next, the server accepts the provider sensitive data received 1814.

Figure 19A:
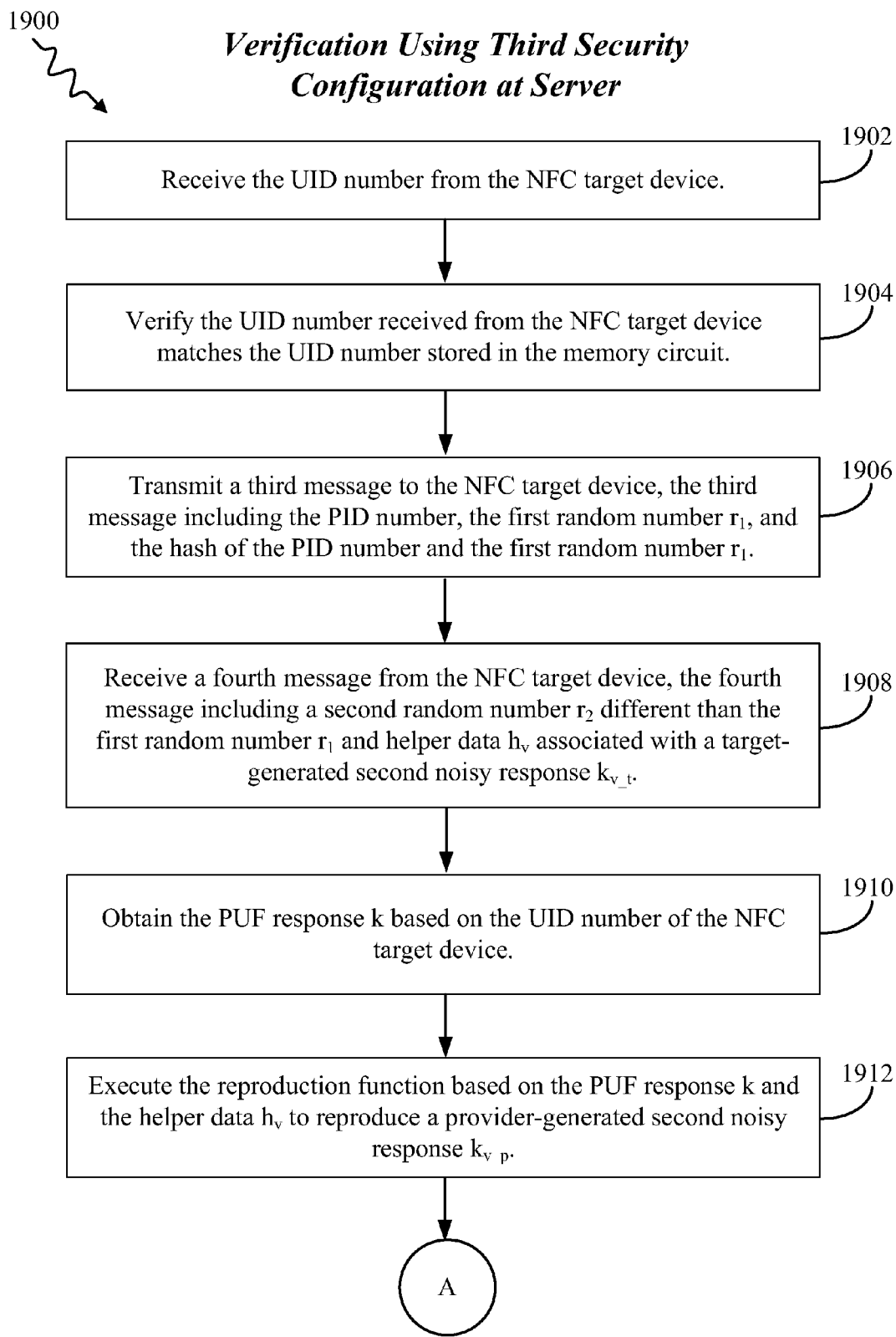
FIGS. 19A and 19B illustrate a process flow diagram of a verification process taking place at the server based on the third security configuration.
Figure 19B:
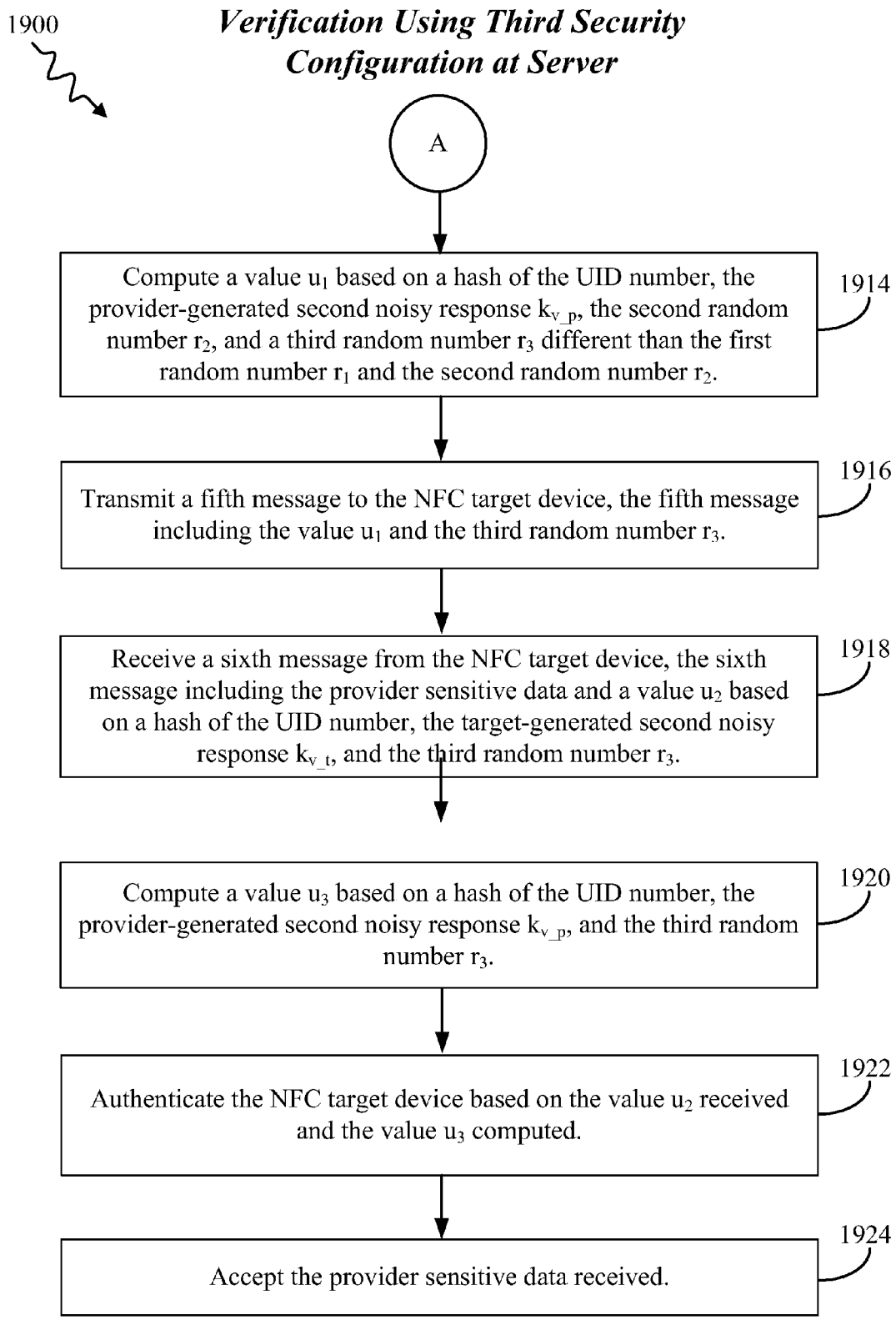

FIGS. 19A and 19B illustrate a process flow diagram 1900 of a verification process taking place at the server 106a based on the third security configuration 800 according to one aspect of the disclosure. First, the server receives the UID number from the NFC target device 1902. Then, the server verifies the UID number received from the NFC target device matches the UID number stored in the memory circuit 1904. Next, the server transmits a third message to the NFC target device, where the third message includes the PID number, the first random number $r_1$, and the hash of the PID number and the first random number $r_1$ 1906. Then, the server receives a fourth message from the NFC target device, where the fourth message includes a second random number $r_2$ different than the first random number $r_1$ and helper data $h_v$ associated with a target-generated second noisy response $k_{v\_t}$ 1908. Next, the server obtains the PUF response k based on the UID number of the NFC target device 1910. Then, the server executes the reproduction function based on the PUF response k and the helper data $h_v$ to reproduce a provider-generated second noisy response $k_{v\_p}$ 1912.

Next, the server computes a value $u_1$ based on a hash of the UID number, the provider-generated second noisy response $k_{v\_p}$, the second random number $r_2$, and a third random number $r_3$ different than the first random number $r_1$ and the second random number $r_2$ 1914. Then, the server transmits a fifth message to the NFC target device, where the fifth message includes the value $u_1$ and the third random number $r_3$ 1916. Next, the server receives a sixth message from the NFC target device, where the sixth message includes the provider sensitive data and a value $u_2$ based on a hash of the UID number, the target-generated second noisy response $k_{v\_t}$, and the third random number $r_3$ 1918. Then, the server computes a value $u_3$ based on a hash of the UID number, the provider-generated second noisy response $k_{v\_p}$, and the third random number $r_3$ 1920. Next, the server authenticates the NFC target device based on the value $u_2$ received and the value $u_3$ computed 1922. Then, the server accepts the provider sensitive data received 1924.

Figure 20:
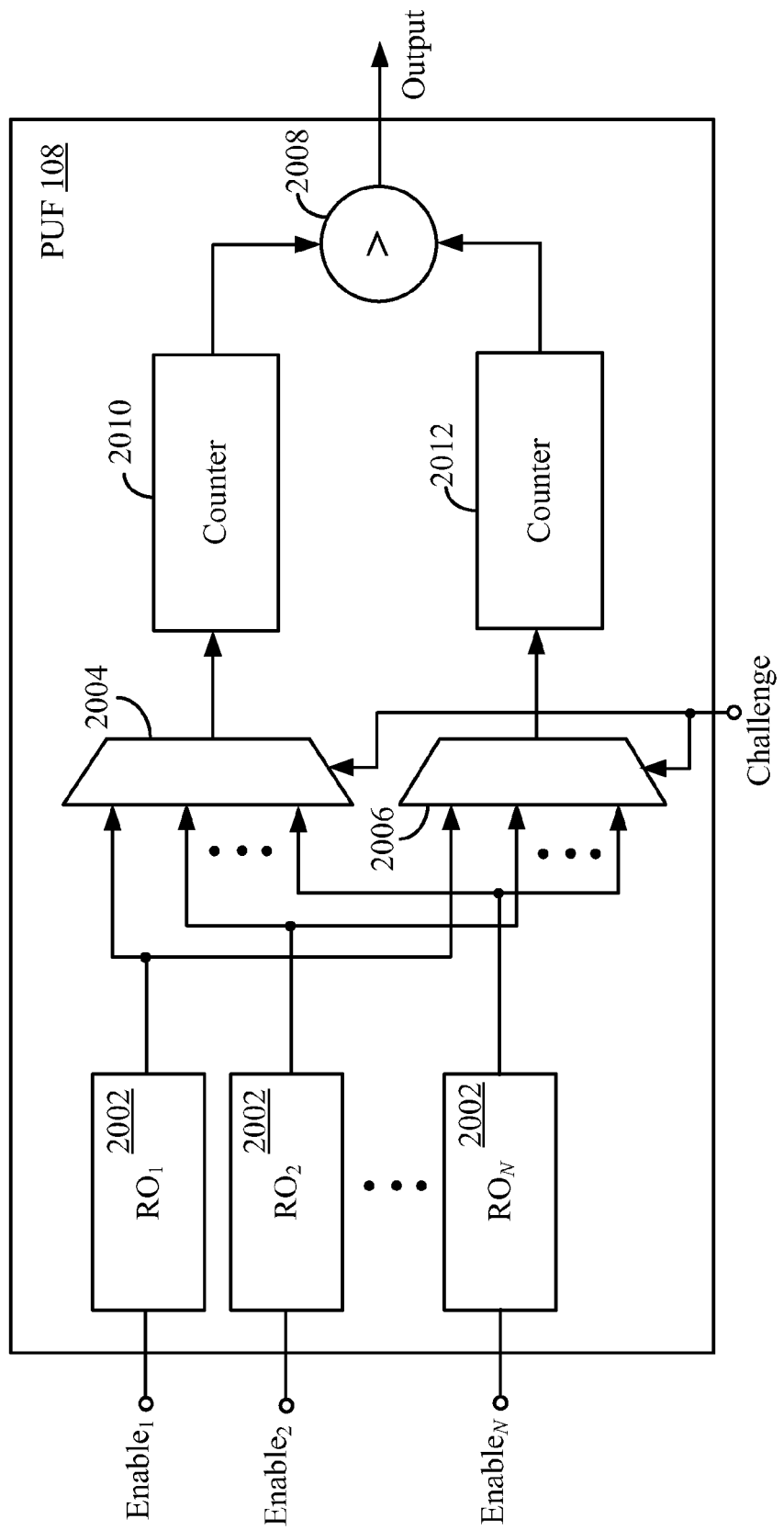
FIG. 20 illustrates a schematic block diagram of one example of the NFC card's PUF.

FIG. 20 illustrates a schematic block diagram of one example of the NFC card's PUF 108 according to one aspect. As shown, the PUF 108 may be a ring oscillator based PUF. A plurality of ring oscillators (ROs) 2002 may be concurrently enabled and their outputs are sent to two or more switches (multiplexers) 2004, 2006. A challenge serves as input to each switch 2004, 2006, which causes each switch 2004, 2006 to then select a single RO from among the plurality of ROs 2002. The challenges sent to the switches 2004, 2006 are designed such that each switch 2004, 2006 selects a different RO. The selected ROs each have a slightly different resonating frequency associated with them due to slight semiconductor-level manufacturing variations, even though each may have been manufactured to be identical. The PUF output (response) is generated by a pair-wise comparison 2008 of these selected ring oscillators' frequencies as measured/stored by the counters 2010, 2012. For example, if the first counter 2010 detects a higher frequency than the second counter 2012, then a logical "1" may be generated, otherwise a logical "0" may be generated. In this fashion, the comparisons made represent a challenge/response mechanism where the chosen RO pair is the challenge and the RO frequency comparison result is the response. The same challenge issued to different yet (almost) identically manufactured NFC cards 102 having the PUF 108 will lead to different response values. This in turn helps identify one NFC card 102 from another even though the NFC cards 102 may have been manufactured to be the same.

The example shown in FIG. 20 is just one example of a PUF that may be used for the NFC card's PUF 108. Many other PUF designs including, but not limited to, arbiter PUFs, SRAM PUFs, etc. may also be used as the NFC card's 102 PUF 108.

Figure 21:
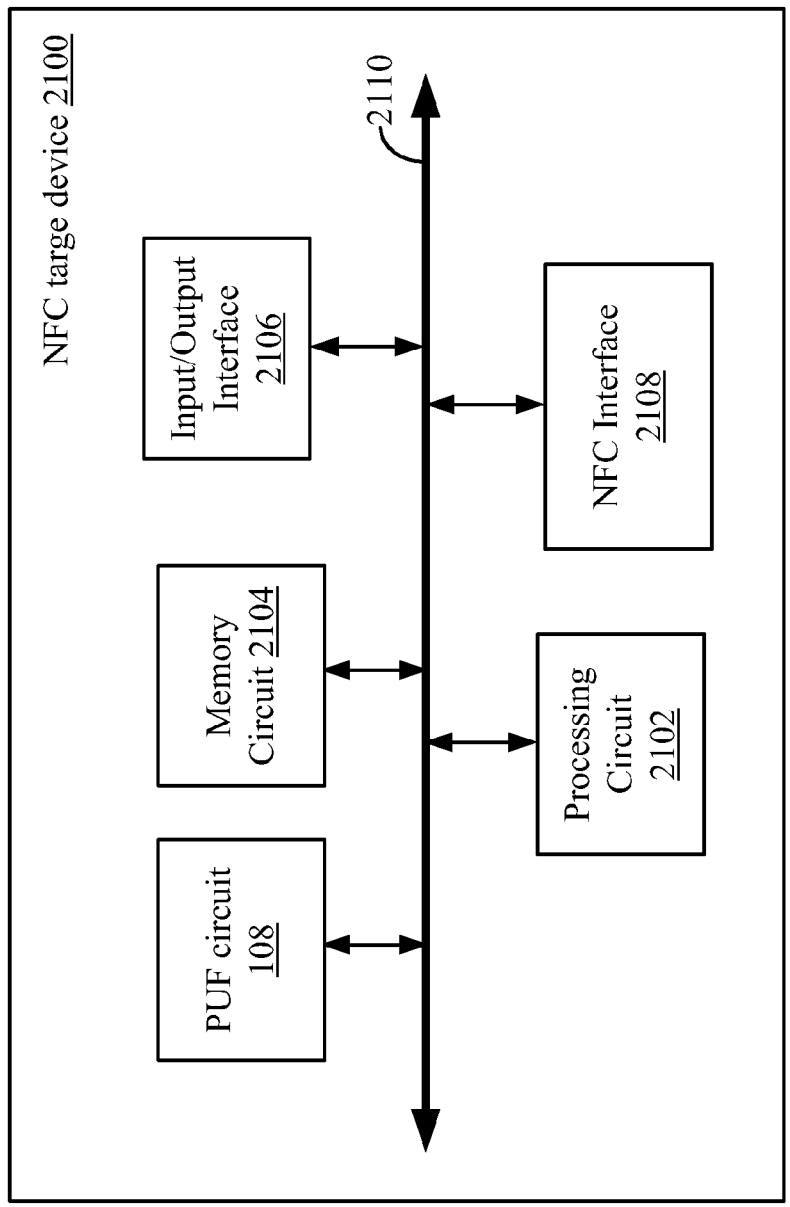
FIG. 21 illustrates a schematic block diagram of an NFC target device.

FIG. 21 illustrates a schematic block diagram of an NFC target device 2100 according to one aspect of the disclosure. The NFC target device 2100 may include a the PUF circuit 108, a processing circuit 2102, a memory circuit 2104, an input/output (I/O) interface 2106, and/or an NFC communication interface 2108. One or more these components/circuits 108, 2102, 2104, 2106, 2108 may be communicatively coupled to each other through, for example, a communication bus 2110. The NFC target device 2100 may have its own power source (not shown) or instead may be passive in that it is powered by RF radiation provided by an NFC interrogator.

The memory circuit 2104 may include, among other things, sensitive data associated with a user of the NFC target device 2100 and/or one or more providers. For example, the memory circuit 2104 may include the sensitive data 110 shown and described in FIGS. 1, 2, 3, 4, 5, 6, 7A, 7B, 8A, 8B, 9, 10, 11, 12, 13, 14A, 14B, 15, 16, 17, 18A, 18B, 19A, and/or 19B. The I/O interface 2106 may include one or more buttons, a keyboard, sensors, camera, touchscreen, etc. Alternative, the NFC target device 2100 may not have an I/O interface 2106. The NFC communication interface 2108 allows the NFC target device 2100 to transmit and receive data through NFC protocols. For example, the NFC communication interface 2108 allows the NFC target device 2100 to communicate with the WCD 104 having an NFC interrogator and/or a server 106a equipped with an NFC interrogator.

The processing circuit 2102 is generally adapted to execute processes and/or software instructions stored on the memory circuit 2104. The processing circuit 2102 may be adapted to: receive a plurality of provider identification (PID) numbers from a plurality of providers, where each PID number is associated with a different provider; store the PID numbers at the memory circuit 2104; assign a privilege mask of a plurality of privilege masks to each PID number received and stored; transmit to each provider the portion of the sensitive data associated to the provider based on the privilege mask assigned to the PID number associated with the provider; receive a privilege mask request from each provider indicating a desired level of sensitive data access before assigning the privilege mask to each PID number received and stored; provide one or more PID numbers of the plurality of PID numbers as input challenges to the PUF circuit 108; receive one or more PUF output responses from the PUF circuit 108 in response to providing the one or more PID numbers as input challenges, the PUF output responses being different from one another and associated with different providers; and/or authenticate one or more providers using, at least in part, the one or more PUF output responses associated with the different providers.

Figure 22:
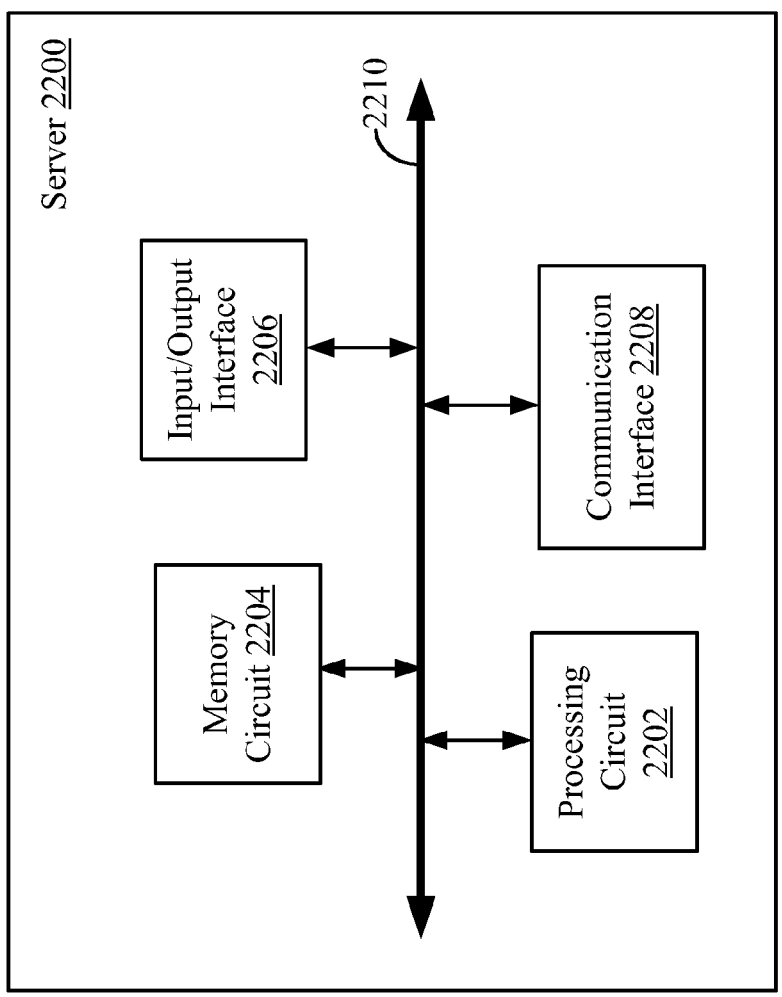
FIG. 22 illustrates a schematic block diagram of a server.

FIG. 22 illustrates a schematic block diagram of a server 2200 according to one aspect of the disclosure. The server 2200 may include a processing circuit 2202, a memory circuit 2204, an input/output (I/O) interface 2206, and/or an communication interface 2208. One or more these components/circuits 2202, 2204, 2206, 2208 may be communicatively coupled to each other through, for example, a communication bus 2210.

The memory circuit 2104 may store, among other things, an NFC card's UID and PUF responses k. The I/O interface 2106 may include a keyboard, mouse, touchscreen, camera, sensors, etc. The communication interface 2208 allows the server 2200 to transmit and receive data using short or long range communication protocols and may also allow for NFC protocols. For example, the communication interface 2208 allows the server 2200 to communicate with the WCD 104 and may also allow the server 2200 to communicate to the NFC card 102 directly through NFC protocols.

The processing circuit 2202 is generally adapted to execute processes and/or software instructions stored on the memory circuit 2204. The processing circuit 2202 may be adapted to: transmit a provider identification (PID) number to the NFC target device; transmit a privilege mask request to the NFC target device, the privilege mask request indicating a desired privilege mask to be associated with the PID number; receive a user identification (UID) number associated with the NFC target device from the NFC target device; and/or store the UID number in the memory circuit 2204.

One or more of the components, steps, features, and/or functions illustrated in FIGS. 1, 2, 3, 4, 5, 6, 7A, 7B, 8A, 8B, 9, 10, 11, 12, 13, 14A, 14B, 15, 16, 17, 18A, 18B, 19A, 19B, 20, 21, and/or 22 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, 3, 4, 5, 20, 21, and/or 22 may be configured to perform one or more of the methods, features, or steps described in FIGS. 6, 7A, 7B, 8A, 8B, 9, 10, 11, 12, 13, 14A, 14B, 15, 16, 17, 18A, 18B, 19A, and/or 19B. The algorithms described herein may also be efficiently implemented in software and/or embedded in hardware.

Moreover, in one aspect of the disclosure, the processing circuit 2102 illustrated in FIG. 21 may be a specialized processor (e.g., an application specific integrated circuit (e.g., ASIC)) that is specifically designed and/or hard-wired to perform the algorithms, methods, and/or steps described in FIGS. 6, 7A, 7B, 8A, 8B, 9, 10, 11, 12, 13, 14A, and/or 14B and related text. Thus, such a specialized processor (e.g., ASIC) may be one example of a means for executing the algorithms, methods, and/or steps described in FIGS. 6, 7A, 7B, 8A, 8B, 9, 10, 11, 12, 13, 14A, and/or 14B.

Similarly, in another aspect of the disclosure, the processing circuit 2202 illustrated in FIG. 22 may be a specialized processor (e.g., ASIC) that is specifically designed and/or hard-wired to perform the algorithms, methods, and/or steps described in FIGS. 6, 7A, 7B, 8A, 8B, 9, 15, 16, 17, 18A, 18B, 19A, and/or 19B and related text. Thus, such a specialized processor (e.g., ASIC) may be one example of a means for executing the algorithms, methods, and/or steps described in FIGS. 6, 7A, 7B, 8A, 8B, 9, 15, 16, 17, 18A, 18B, 19A, and/or 19B.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing or containing instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A device, comprising:
   a memory circuit adapted to store sensitive data;
   an NFC interface adapted to transmit and receive information using NFC protocols; and
   a processing circuit communicatively coupled to the memory circuit and the NFC interface, the processing circuit adapted to
   receive a plurality of provider identification (PID) numbers from a plurality of providers, each PID number associated with a different provider,
   store the PID numbers at the memory circuit, and
   assign a privilege mask of a plurality of privilege masks to each PID number received and stored, each privilege mask of the plurality of privilege masks designating a limited portion of the sensitive data as accessible to a provider of the plurality of providers, each privilege mask further designating a specific response protocol to be followed by the device and the provider when the limited portion of the sensitive data is to be accessed by the provider.

2. The device of claim 1, wherein the processing circuit is further adapted to:
   transmit to each provider the portion of the sensitive data associated to the provider based on the privilege mask assigned to the PID number associated with the provider.

3. The device of claim 1, wherein the processing circuit is further adapted to:
receive a privilege mask request from each provider indicating a desired level of sensitive data access before assigning the privilege mask to each PID number received and stored.

4. The device of claim 1, further comprising:
a physical unclonable function (PUF) circuit communicatively coupled to the processing circuit, the PUF circuit adapted to generate output responses to input challenges, and wherein the processing circuit is further adapted to:
provide one or more PID numbers of the plurality of PID numbers as input challenges to the PUF circuit, and
receive one or more PUF output responses from the PUF circuit in response to providing the one or more PID numbers as input challenges, the PUF output responses being different from one another and associated with different providers.

5. The device of claim 4, wherein the processing circuit is further adapted to:
authenticate one or more providers using, at least in part, the one or more PUF output responses associated with the different providers.

6. The device of claim 1, wherein the processing circuit is further adapted to enroll at least a first provider according to a security configuration causing the processing circuit to:
receive a first PID number from the first provider, the first PID number identifying the first provider;
store the first PID number at the memory circuit;
assign a first privilege mask to the first PID number, the first privilege mask designating at least a portion of the sensitive data as first provider sensitive data; and
transmit a user identification (UID) number associated with the device to the first provider, the UID number identifying the device.

7. The device of claim 6, wherein the processing circuit is further adapted to verify the first provider according to the security configuration causing the processing circuit to:
receive the first PID number from the first provider;
apply the first privilege mask assigned to the first PID number to limit the sensitive data available to the first provider to the first provider sensitive data; and
transmit the UID number and the first provider sensitive data to the first provider.

8. The device of claim 1, further comprising a physical unclonable function (PUF) circuit communicatively coupled to the processing circuit, the PUF circuit adapted to generate output responses to input challenges, and wherein the processing circuit is further adapted to enroll at least a first provider according to a security configuration causing the processing circuit to:
receive a first message from the first provider, the first message including a first PID number and a hash of the first PID number and a first random number $r_1$, the first PID number identifying the first provider;
store the first PID number at the memory circuit;
assign a first privilege mask to the first PID number, the first privilege mask designating at least a portion of the sensitive data as first provider sensitive data;
provide the hash of the first PID number and the first random number $r_1$ to the PUF circuit as an input challenge to obtain a first noisy response $k_e$;
execute a helper data generation function to generate helper data $h_e$ associated with the first noisy response $k_e$; and
transmit a second message to the first provider, the second message including a user identification (UID) number, the first noisy response $k_e$, and the helper data $h_e$, the UID number identifying the device.

9. The device of claim 8, wherein the processing circuit is further adapted to verify the first provider according to the security configuration causing the processing circuit to:
receive a third message from the first provider, the third message including the first PID number, the first random number $r_1$, and the hash of the first PID number and the first random number $r_1$;
apply the first privilege mask assigned to the first PID number to limit the sensitive data available to the first provider to the first provider sensitive data;
provide the hash of the first PID number and the first random number $r_1$ to the PUF circuit as an input challenge to obtain a target-generated second noisy response $k_{v\_t}$;
execute the helper data generation function to generate helper data $h_v$ associated with the target-generated second noisy response $k_{v\_t}$;
compute a value $u_1$ that includes a hash of the UID number, the helper data $h_v$, the target-generated second noisy response $k_{v\_t}$, and a second random number $r_2$; and
transmit a fourth message to the first provider, the fourth message including the UID number, the value $u_1$, the second random number $r_2$, the helper data $h_v$, and the first provider sensitive data.

10. The device of claim 8, wherein the processing circuit is further adapted to verify the first provider according to a security configuration causing the processing circuit to:
transmit the UID number to the first provider;
receive a third message from the first provider, the third message including the first PID number, the first random number $r_1$, and the hash of the first PID number and the first random number $r_1$;
provide the hash of the first PID number and the first random number $r_1$ to the PUF circuit as an input challenge to obtain a target-generated second noisy response $k_{v\_t}$;
execute the helper data generation function to generate helper data $h_v$ associated with the target-generated second noisy response $k_{v\_t}$;
transmit a fourth message to the first provider, the fourth message including a second random number $r_2$ and the helper data $h_v$, the second random number $r_2$ different than the first random number $r_1$;
receive a fifth message from the first provider, the fifth message including a third random number $r_3$ and a value $u_1$, the third random number different than the first random number $r_1$ and the second random number $r_2$, the value $u_1$ based on a hash of the UID number, a provider-generated second noisy response $k_{v\_p}$, the second random number $r_2$, and the third random number $r_3$;
compute a value $u_2$ based on a hash of the UID number, the target-generated second noisy response $k_{v\_t}$, the second random number $r_2$, and the third random number $r_3$;
authenticate the first provider based on the value $u_1$ received and the value $u_2$ computed;
apply the first privilege mask assigned to the first PID number to limit the sensitive data available to the first provider to the first provider sensitive data; and
transmit a sixth message to the first provider, the sixth message including the first provider sensitive data and a hash of the UID number, the target-generated second noisy response $k_{v\_p}$, and the third random number $r_3$.

11. The device of claim 10, wherein the processing circuit is further adapted to:
encrypt the first provider sensitive data in the sixth message with the target-generated second noisy response $k_{v\_t}$ as a cryptographic key prior to transmitting the sixth message to the first provider.

12. A method operational at a device, the method comprising:
receiving a plurality of provider identification (PID) numbers from a plurality of providers, each PID number associated with a different provider;
storing the PID numbers at a memory circuit; and
assigning a privilege mask of a plurality of privilege masks to each PID number received and stored, each privilege mask of the plurality of privilege masks designating a limited portion of a sensitive data as accessible to a provider of the plurality of providers, each privilege mask further designating a specific response protocol to be followed by the device and the provider when the limited portion of the sensitive data is to be accessed by the provider.

13. The method of claim 12, further comprising:
receiving a privilege mask request from each provider indicating a desired level of sensitive data access before assigning the privilege mask to each PID number received and stored.

14. The method of claim 12, further comprising:
providing one or more PID numbers of the plurality of PID numbers as input challenges to a PUF circuit, and
receiving one or more PUF output responses from the PUF circuit in response to providing the one or more PID numbers as input challenges, the PUF output responses being different from one another and associated with different providers.

15. The method of claim 14, further comprising:
authenticating one or more providers using, at least in part, the one or more PUF output responses associated with the different providers.

16. A server comprising:
a communication interface adapted to directly and/or indirectly transmit to and receive information from a near field communication (NFC) target device;
a memory circuit; and
a processing circuit communicatively coupled to the communication interface and the memory circuit, the processing circuit adapted to
transmit a provider identification (PID) number to the NFC target device, the PID number associated with a provider that is associated with the server, the PID number being different than PID numbers of other providers,
transmit a privilege mask request to the NFC target device, the privilege mask request indicating a desired privilege mask to be associated with the PID number, the desired privilege mask designating a limited portion of sensitive data stored at the NFC target device as provider sensitive data that is associated with the provider and accessible by the server, the desired privilege mask further designating a specific response protocol to be followed by the server and the NFC target device when the limited portion of the sensitive data is to be accessed by the server,
receive a user identification (UID) number associated with the NFC target device from the NFC target device, the UID number identifying the NFC target device, and
store the UID number in the memory circuit.

17. The server of claim 16, wherein transmitting the PID number to the NFC target device, transmitting the privilege mask request to the NFC target device, and receiving and storing the UID number enroll the provider with the NFC target device according to a security configuration, and wherein the processing circuit is further adapted to verify the NFC target device according to the security configuration causing the processing circuit to:
transmit the PID number to the NFC target device;
receive a first message from the NFC target device, the first message including the UID number and the provider sensitive data;
verify that the UID number received in the first message matches the UID number stored in the memory circuit; and
accept the provider sensitive data received.

18. The server of claim 16, wherein the processing circuit is further adapted to enroll with the NFC target device according to a security configuration causing the processing circuit to:
transmit a first message to the NFC target device, the first message including the PID number and a hash of the PID number and a first random number $r_1$;
receive a second message from the NFC target device, the second message including the UID number, a first noisy response $k_e$, and helper data $h_e$ associated with the first noisy response $k_e$;
execute a reproduction function based on the first noisy response $k_e$ and the helper data $h_e$ to reproduce a physical unclonable function (PUF) response k; and
store the response k in the memory circuit, and wherein the processing circuit is further adapted to verify the NFC target device according to the security configuration causing the processing circuit to
transmit a third message to the NFC target device, the third message including the PID number, the first random number $r_1$, and the hash of the PID number and the first random number $r_1$,
receive a fourth message from the NFC target device, the fourth message including the UID number, a value $u_1$, a second random number $r_2$ different than the first random number $r_1$, helper data $h_v$ associated with a target-generated second noisy response $k_{v\_p}$, and the provider sensitive data,
obtain the PUF response k based on the UID number of the NFC target device,
execute the reproduction function based on the PUF response k and the helper data $h_v$ to reproduce a provider-generated second noisy response $k_{v\_p}$,
compute a value $u_2$ based on a hash of the UID number, the helper data $h_v$, the provider-generated second noisy response $k_{v\_p}$, and the second random number $r_2$,
authenticate the NFC target device based on the value $u_1$ received and the value $u_2$ computed, and
accept the provider sensitive data received.

19. The server of claim 16, wherein the processing circuit is further adapted to enroll with the NFC target device according to a security configuration causing the processing circuit to:

transmit a first message to the NFC target device, the first message including the PID number and a hash of the PID number and a first random number $r_1$;

receive a second message from the NFC target device, the second message including the UID number, a first noisy response $k_e$, and helper data $h_e$ associated with the first noisy response $k_e$;

execute a reproduction function based on the first noisy response $k_e$ and the helper data $h_e$ to reproduce a physical unclonable function (PUF) response k; and store the response k in the memory circuit, and wherein the processing circuit is further adapted to verify the NFC target device according to the security configuration causing the processing circuit to receive the UID number from the NFC target device, verify the UID number received from the NFC target device matches the UID number stored in the memory circuit, transmit a third message to the NFC target device, the third message including the PID number, the first random number $r_1$, and the hash of the PID number and the first random number $r_1$, receive a fourth message from the NFC target device, the fourth message including a second random number $r_2$ different than the first random number $r_1$ and helper data $h_v$ associated with a target-generated second noisy response $k_{v\_t}$, obtain the PUF response k based on the UID number of the NFC target device, execute the reproduction function based on the PUF response k and the helper data $h_v$ to reproduce a provider-generated second noisy response $k_{v\_p}$, compute a value $u_1$ based on a hash of the UID number, the provider-generated second noisy response $k_{v\_p}$, the second random number $r_2$, and a third random number $r_3$ different than the first random number $r_1$ and the second random number $r_2$, transmit a fifth message to the NFC target device, the fifth message including the value $u_1$ and the third random number $r_3$, receive a sixth message from the NFC target device, the sixth message including the provider sensitive data and a value $u_2$ based on a hash of the UID number, the target-generated second noisy response $k_{v\_t}$, and the third random number $r_3$, compute a value $u_3$ based on a hash of the UID number, the provider-generated second noisy response $k_{v\_p}$, and the third random number $r_3$, authenticate the NFC target device based on the value $u_2$ received and the value $u_3$ computed, and accept the provider sensitive data received.

20. The server of claim 19, wherein the provider sensitive data is encrypted by the target-generated second noisy response $k_{v\_t}$, and the processing circuit is further adapted to:

decrypt the provider sensitive data received using the provider-generated second noisy response $k_{v\_p}$.

* * * * *